(12) United States Patent
Inagaki et al.

(10) Patent No.: US 7,891,239 B2
(45) Date of Patent: Feb. 22, 2011

(54) FLOW METER AND FLOW VOLUME CONTROLLING DEVICE

(75) Inventors: Hiroyuki Inagaki, Tokyo (JP); Shigeru Aoshima, Tokyo (JP); Takeshi Watanabe, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 12/499,163

(22) Filed: Jul. 8, 2009

(65) Prior Publication Data

US 2010/0070095 A1      Mar. 18, 2010

(30) Foreign Application Priority Data

Sep. 12, 2008    (JP) .............................. 2008-234119

(51) Int. Cl.
*G01F 5/00*    (2006.01)
(52) U.S. Cl. ...................................... 73/202
(58) Field of Classification Search .................. 73/202, 73/202.5, 204.21, 204.11
See application file for complete search history.

(56) References Cited

U.S. PATENT DOCUMENTS

| | | | |
|---|---|---|---|
| 4,270,577 A * | 6/1981 | Brown et al. | 138/39 |
| 5,918,279 A * | 6/1999 | Hecht et al. | 73/204.21 |
| 6,199,434 B1 * | 3/2001 | Cornil et al. | 73/861.83 |
| 6,647,775 B1 * | 11/2003 | Hecht et al. | 73/202.5 |

FOREIGN PATENT DOCUMENTS

| | | |
|---|---|---|
| EP | 0834723 A1 | 4/1998 |
| EP | 1065474 A2 | 1/2001 |
| EP | 1182431 A1 | 2/2002 |
| JP | 2005-024080 A | 1/2005 |
| JP | 2007-121036 A | 5/2007 |
| WO | WO-2005/121718 A1 | 12/2005 |

\* cited by examiner

*Primary Examiner*—Jewel Thompson
(74) *Attorney, Agent, or Firm*—McDermott Will & Emery LLP

(57) ABSTRACT

To provide a flow meter, and a flow volume controlling device equipped therewith, capable of reducing pressure loss while obtaining a flow rectifying effect in a measurement fluid. A flow meter for measuring the flow volume of a measurement fluid, equipped with a flow path wherein the measuring fluid flows, and a flow rectifier that is disposed within the flow path, where the flow rectifier has holes for rectifying the flow of a measurement fluid, and has an area that is wider than the flow path cross-sectional area in a direction that is perpendicular to the direction in which the flow path extends. The flow volume controlling device is provided with the flow meter, a controlling valve, and controlling means for adjusting the flow volume of a fluid that flows through the flow path of the flow meter through controlling the controlling valves based on information regarding the flow volume detected by the flow meter.

13 Claims, 19 Drawing Sheets

FIG. 10
(A)
(B)
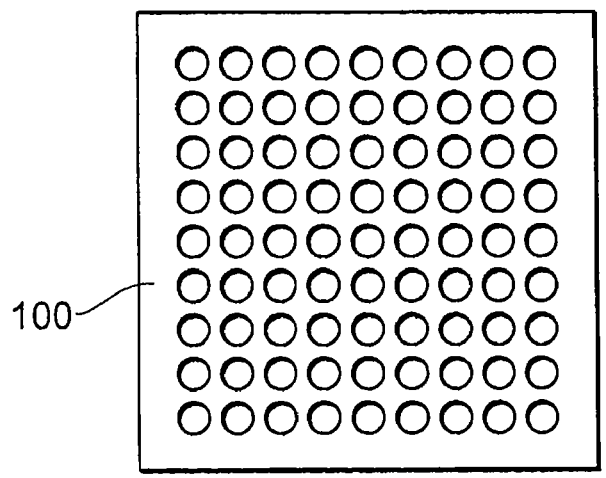
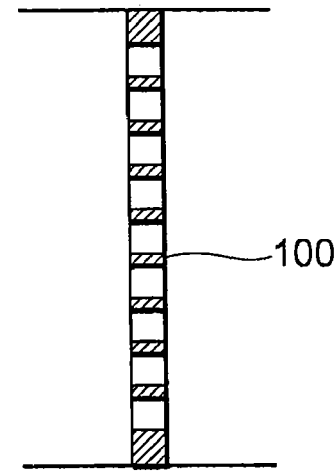

FLOW METER AND FLOW VOLUME CONTROLLING DEVICE

CROSS REFERENCE TO PRIOR APPLICATIONS

The present invention claims priority under 35 U.S.C. §119 to Japanese Patent Application No. 2008-23419 filed Sep. 12, 2008. The content of that application is incorporated herein by reference in its entirety.

FIELD OF TECHNOLOGY

The present invention relates to a flow meter and to a flow meter controlling device.

BACKGROUND OF THE INVENTION

Conventionally flow meters for detecting the flow volume of a measurement fluid have been commercialized. In order to obtain accurate measurements of the flow volume using this type of flow meter, it has been necessary to stabilize the distribution of the speed by controlling turbulence in the measurement fluid flowing through the flow path.

Because of this, at present there are proposals for technologies for controlling the turbulence in the measurement fluid that flows to the flow path through the provision of a plurality of flow rectifying plates in the flow path of the flow meter. (See, for example, Japanese Unexamined Patent Application Publication 2005-24080 ("JP '080").) Additionally, in recent years there have been proposals for technologies for stabilizing the speed distribution of the fluid through causing the fluid to impinge upon an inner wall of the flow path, through the provision of a plurality of curved portions in the flow path. (See, for example, Patent References 2 and 3 International Patent Application Publication 2005/121718 ("JP '718") and Japanese Unexamined Patent Application Publication 2007-121036 ("JP '036").)

However, when the technology as described in JP '080 is used, conventional flow rectifying plates are disposed so as to be perpendicular to the direction in which the flow path extends, and thus there is a problem in that this increases the loss of pressure in the measurement fluid. Additionally, even when the technologies described in JP '718 and JP '036 are used, there is still the danger of an increase in the pressure loss in the measurement fluid due to the many curved portions that are provided in order to obtain a repeatable and uniform flow speed distribution.

The present invention is the result of contemplation on this situation, and the object thereof is to provide a flow meter and a flow volume controlling device equipped therewith, capable of obtaining a flow rectifying effect in the measurement fluid while preventing an increase in pressure loss.

SUMMARY OF THE INVENTION

In order to achieve the object set forth above, the flow meter according to the present invention includes a flow path wherein the measurement fluid flows, and a flow rectifier disposed within the flow path, wherein the flow rectifier has a hole for rectifying the flow of the measurement fluid, and a cross-sectional area that is wider than the cross-sectional area of the flow path in a direction that is perpendicular to the direction in which the flow path extends.

When this structure is used, the flow rectifier has an area that is larger than the cross-sectional area of the flow path in the direction that is perpendicular to the direction in which the flow path extends, making it possible to increase the number of holes for flow rectification formed in the flow rectifier, and possible to increase the total area thereof, and thus possible to suppress the increase in pressure loss in the measurement fluid due to the flow rectifier, while still possible to obtain the flow rectifying effect. Consequently, it is possible to increase the measurement accuracy of the flow volume of the measurement fluid.

In flow meter described above it is possible to use a flow rectifier having at least one flow rectifying plate, disposed at an incline relative to the direction in which the flow path extends.

When this structure is used, the flow rectifying plate that structures the flow rectifier is disposed at an "incline" relative to the direction in which the flow path extends (or in other words, in a state that is not perpendicular to the direction in which the flow path extends), and thus it is possible to increase the area of the flow rectifying plate relative to a flow rectifying plate that is disposed in a state that is perpendicular to the direction in which the flow path extends, as has been done conventionally. Consequently, it is possible to increase the number of holes for a flow rectification that are formed in the flow rectifier, and to increase in the total area thereof, making it possible to suppress the increase in pressure loss in the measurement fluid caused by the flow rectifier, and still possible to obtain the flow rectifying effect. Consequently, it is possible to increase the measurement accuracy of the flow volume of the measurement fluid.

In the flow meter described above the outer peripheral surface of the flow rectifying plate can be disposed in contact with the inner wall of the flow path around the entire periphery thereof.

The use of this structure makes it possible to reliably secure the flow rectifying plate to the flow path through the force of friction that acts between the outer peripheral surface of the flow rectifying plate and the inner wall of the flow path. Additionally, because the outer peripheral surface of the flow rectifying plate is in contact with the inner wall of the flow path around the entire periphery, it is possible to prevent the formation of a gap between the flow rectifying plate and the flow path.

Additionally, in the flow meter described above it is possible to form a straight pipe-shaped flow path through the cover member covering the opening portion of the flow path block, through providing a flow path block that is not only provided, on the interior thereof, with a flow path forming a portion that extends in the form of a straight line in order to form the flow path, but that also has an opening portion for connecting from above the flow path forming portion to the outside. Additionally, when the cover member covers the opening portion of the flow path block, while the outer peripheral surface of the flow rectifying plate is caused to contact the cover member, the outer peripheral portion of the flow path plate is also caused to contact the inner wall of the flow path block, thus making it possible for the flow rectifying plate to be secured by being held between the cover member and the inner wall of the flow path block. At this time, the location of contact of the flow rectifying plate in the cover member and the location of contact of the flow rectifying plate in the flow path block can be set so as to be different locations in the direction in which the straight pipe-shaped flow path extends.

In the flow meter, a straight pipe-shaped flow path having a sensor flow path portion wherein is disposed a flow sensor for detecting the flow speed or flow volume of the measurement fluid, a wide diameter flow path portion having a larger flow path cross-sectional area than that of the sensor flow path portion, formed on the upstream side and/or the downstream side of the sensor flow path portion, may be used. Additionally, the end surface of the sensor flow path portion side of the wide diameter flow path portion is provided in a state that is at an incline relative to a plane that is perpendicular to the direction in which the straight pipe-shaped flow path extends, enabling the flow rectifying plate to be secured through being disposed so as to contact the end surface of the wide diameter flow path portion of the straight pipe-shaped flow path.

The use of this structure enables the flow rectifying plate to be secured through being disposed at an angle relative to the direction in which the straight pipe-shaped flow path extends. Consequently, in a flow meter having a straight pipe-shaped flow path, the increase in pressure loss in the measurement fluid can be suppressed, and the flow rectifying effect can be produced, making it possible to increase the measurement accuracy of the flow volume of the measurement fluid.

Furthermore in the flow meter described above, not only can there be a sensor flow path portion that extends in the form of a straight line, wherein the flow sensor that detects the flow speed or flow volume of the measurement fluid is disposed, but also the upstream side and/or the downstream side of the sensor flow path portion may use a curved flow path that is structured from a curved portion so as to be curved, and in this case, a flow rectifier that is structured from a flat plate that is disposed on the inner wall of the sensor flow path portion and from a flow rectifying plate that is in contact, at an angle, with the upstream side end portion and/or the downstream side end portion of the flat plate, may be used, where the outer peripheral surface of the flow rectifying plate may be disposed so as to contact the inner wall of the curved portion of the curved flow path, to thereby secure the flow rectifier in the curved flow path.

The use of the structure enables the flow rectifying plate to be secured through being disposed at an angle relative to the direction in which the sensor flow path portion of the curved flow path extends. Consequently, in a flow meter having a curved flow path, the increase in pressure loss in the measurement fluid can be suppressed, and the flow rectifying effect can be obtained, enabling an increase in the measurement accuracy of the flow volume of the measurement fluid.

Additionally, in the flow meter set forth above, a flow path block that is provided, on the inside thereof, with a sensor flow path forming portion that extends in the form of a straight line, for forming a sensor flow path portion for the curved flow path, and which has an opening portion for connecting from above the sensor flow path forming portion to the outside, and a circuit board having a flow sensor on one surface thereof and having electric circuit electrodes for connecting to an electric circuit for performing the measurement principle using the flow sensor, on the other surface thereof, may be used. In this case, the circuit board may be disposed, relative to the flow path block, so that the circuit board blocks the opening portion of the flow path block, and so that the flow sensor of the circuit board faces the sensor flow path forming portion of the flow path block, to enable the formation of the sensor flow path portion of the curved flow path.

The use of this structure enables the flow rectifier to be disposed easily within the curved flow path through entering through the opening portion of the flow path block that structures and the curved flow path.

Additionally, in the flow meter described above, the flow rectifying plate may be structured through forming holes through punching a rigid plate-shaped member.

The use of this structure enables a rigid flow rectifying plate to be obtained, enabling the application of this flow rectifying plate to a flow meter for a medium volume flow through a large volume flow.

Additionally, in the flow meter described above, the flow rectifying plate may be structured through forming holes through etching a thin plate.

The use of this structure enables a thin flow rectifying plate to be obtained, enabling this flow rectifying plate to be applied to a flow meter for measuring extremely small flow volumes.

Additionally, in the flow meter described above, a colander-shaped flow rectifier that is formed so as to bulge out in one direction in the direction in which the flow path extends may be used.

Additionally, the flow volume controlling device as set forth in the present invention may be provided with the flow meter described above, a controlling valve, and controlling means for adjusting the flow volume of a fluid that flows through the flow path of the flow meter through controlling the controlling valve based on information pertaining to the flow volume, detected by the flow meter.

The use of this structure provides a flow meter with high measurement accuracy for the flow volume, through making it possible to obtain a flow rectifying effect in the measurement fluid while suppressing the increase in the pressure drop, thereby enabling an increase in the accuracy of the adjustment of the flow volume of the fluid.

The present invention enables the provision of a flow meter, and a flow volume controlling device equipped therewith, capable of producing a flow rectifying effect in the measurement fluid while suppressing an increase in the pressure loss.

BRIEF DESCRIPTION OF THE DRAWINGS

FIGS. 10A and 10B illustrate square flow rectifying plates of a conventional flow meter, where (A) is a diagram when viewed from the upstream side of the flow path, and (B) is a cross-sectional diagram when viewed from the side of the flow path.

DETAILED DESCRIPTION OF THE INVENTION

A flow meter, and a flow volume controlling device, according to an example of embodiment according to the present invention will be described below in reference to the figures.

Figure 1:
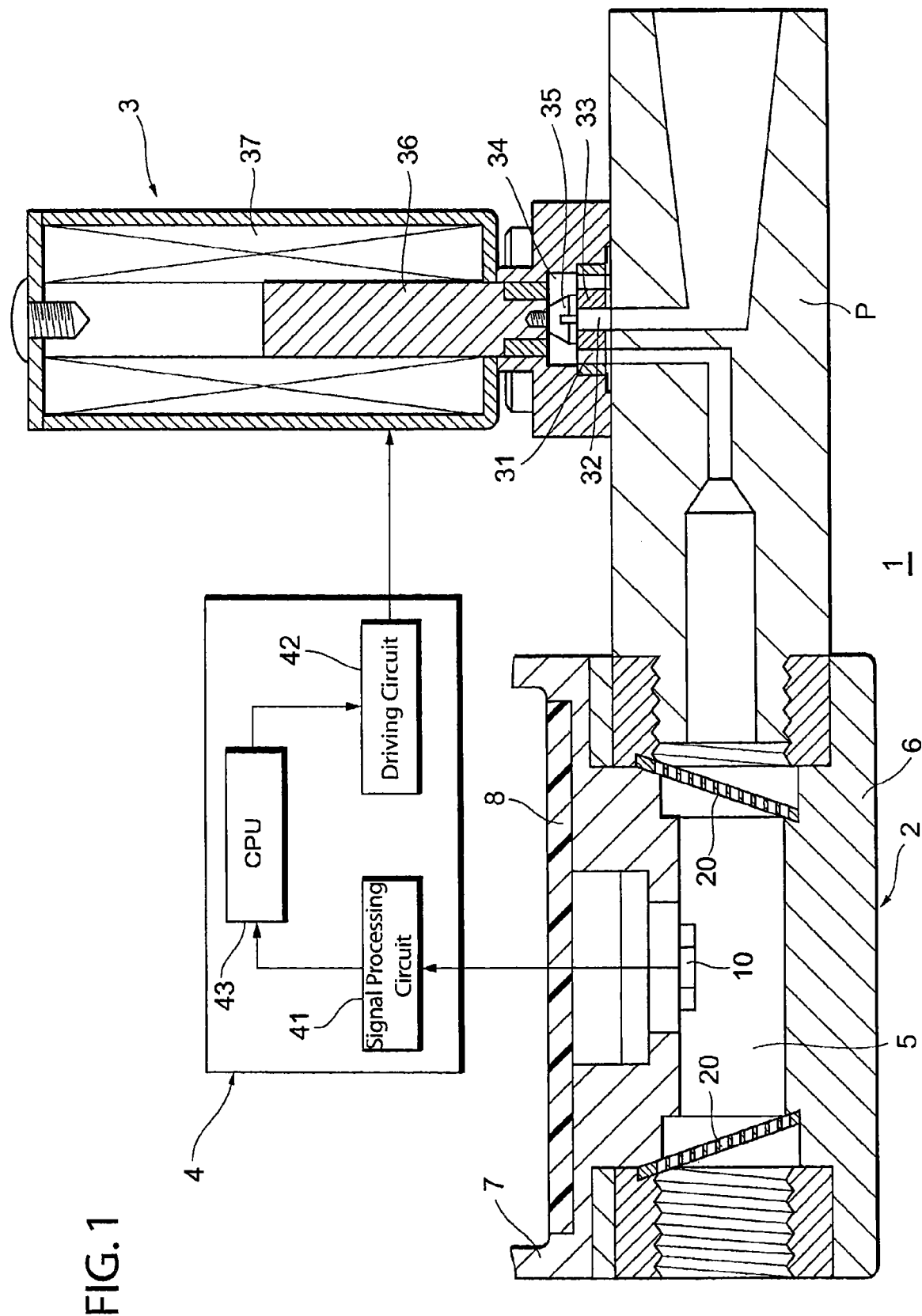
FIG. 1 is a schematic structural diagram for explaining the structure of a flow volume controlling device according to a first form of embodiment according to the present invention.

A summary of the structure of a flow volume controlling device 1 as set forth in an embodiment according to the present invention will be explained below. The flow volume controlling device 1 as set forth in the present form of embodiment is provided with: a flow meter 2 for measuring the flow volume of a fluid; a controlling valve 3 for adjusting the flow volume of a fluid, provided on the downstream side of the flow meter 2; and controlling means 4 for controlling the controlling valve 3, as illustrated in FIG. 1. The flow meter 2 is a flow meter according to an embodiment according to the present invention, and has a straight-formed flow path (a straight pipe-shaped flow path). The structure of the flow meter 2 will be described in detail below.

The controlling valve 3 is a solenoid valve having: a valve seat 33 wherein is formed a primary-side flow path 31 and a secondary-side flow path 32, wherein a fluid flows; a valve chamber 34 wherein the primary-side flow path 31 and the secondary-side flow path 32 are connected; a valve unit 35 that opens and closes the secondary-side flow path 32, housed in the valve chamber 34; a magnetic plunger 36 that is connected to the valve unit 35; a solenoid coil 37 to which is attached electric power, wherein the plunger 36 moves upward or downward; and the like.

The controlling means 4 are that which adjusts the flow volume of the fluid through controlling the controlling valve 3 based on information relating to the flow volume that is detected by the flow meter 2. The controlling means 4 have: a signal processing circuit 41 for processing detection signals from the flow meter 2; a driving circuit 42 for driving the controlling valve 3; a CPU 43 for controlling the driving circuit 42 based on the detected value for the flow volume, processed by the signal processing circuit 41; and so forth. The CPU 43 drives and controls the controlling valve 3 through the driving circuit 42 to reduce the flow volume if the detected value for the flow volume is greater than a set value, while, on the other hand, if the detected value for the flow volume is less than the set value, the CPU 43 increases the flow volume through driving and controlling the controlling valve 3 through the driving circuit 42.

Next the structure of the flow meter 2 in relation to the present form of embodiment will be described using FIG. 2 through FIG. 9.

Figure 2:
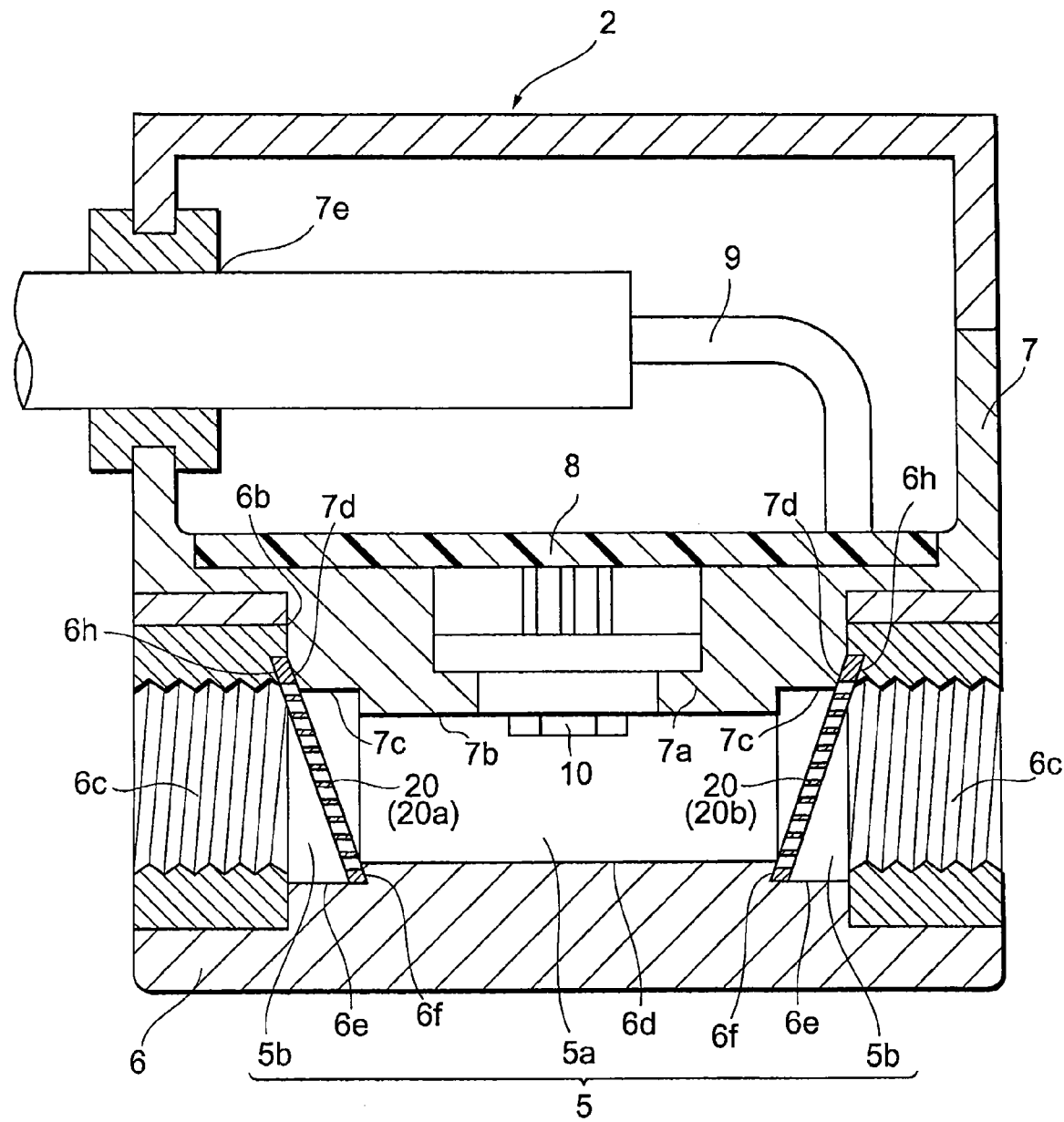
FIG. 2 is a cross-sectional diagram of a flow meter (having a straight pipe-shaped flow path) according to the first form of embodiment according to the present invention.

The flow meter 2, as illustrated in FIG. 2, is provided with: a straight pipe-shaped flow path 5 in which the measurement fluid flows; a flow sensor 10 for detecting the flow speed or flow volume of the measurement fluid, disposed in essentially the center position, in the lengthwise direction, of the straight pipe-shaped flow path 5; a flow rectifier 20 (flow rectifying plates 20a and 20b), disposed within the straight pipe-shaped flow path 5, wherein holes 21, for flow rectification of the measurement fluid, are formed; and the like.

The straight pipe-shaped flow path 5 in the present embodiment, as illustrated in FIG. 2, has: a sensor flow path portion 5a in which the flow sensor 10 is disposed; and a wide diameter flow path portion 5b having a flow path cross-sectional area that is greater than that of the sensor flow path portion 5a, and which is formed on the upstream side and/or the downstream side of the sensor flow path portion 5a. The cross-sectional shapes of the sensor flow path portion 5a and of the wide diameter flow path portion 5b are both rectangular shapes. The straight pipe-shaped flow path 5 (that is, the sensor flow path portion 5a and the wide diameter flow path portion 5b) are formed through a cover member 7 blocking an opening portion 6b that is provided on the top surface of a flow path block 6.

Figure 3:
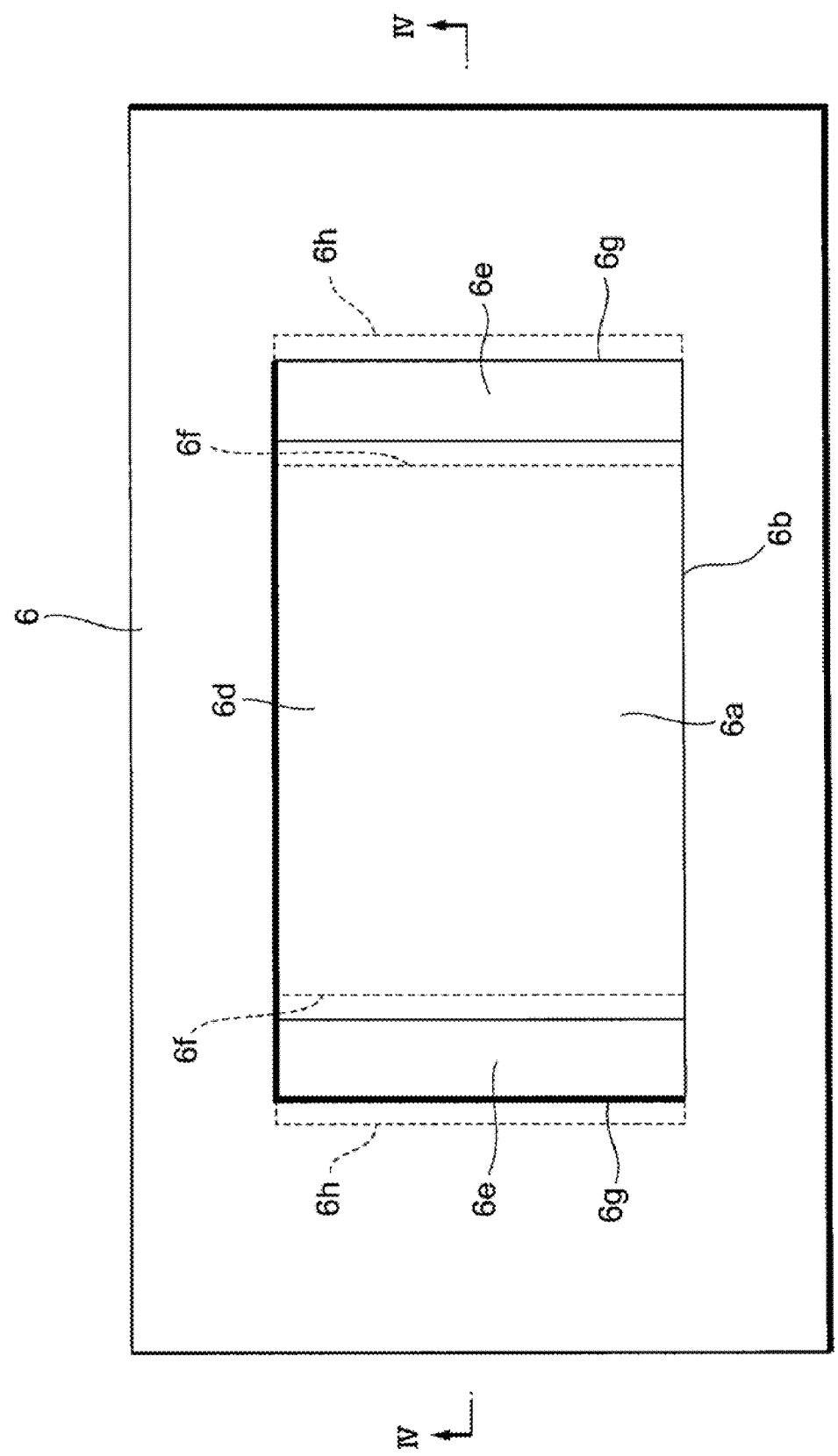
FIG. 3 is a top view diagram of a flow path block for the flow meter of FIG. 2.
Figure 4:
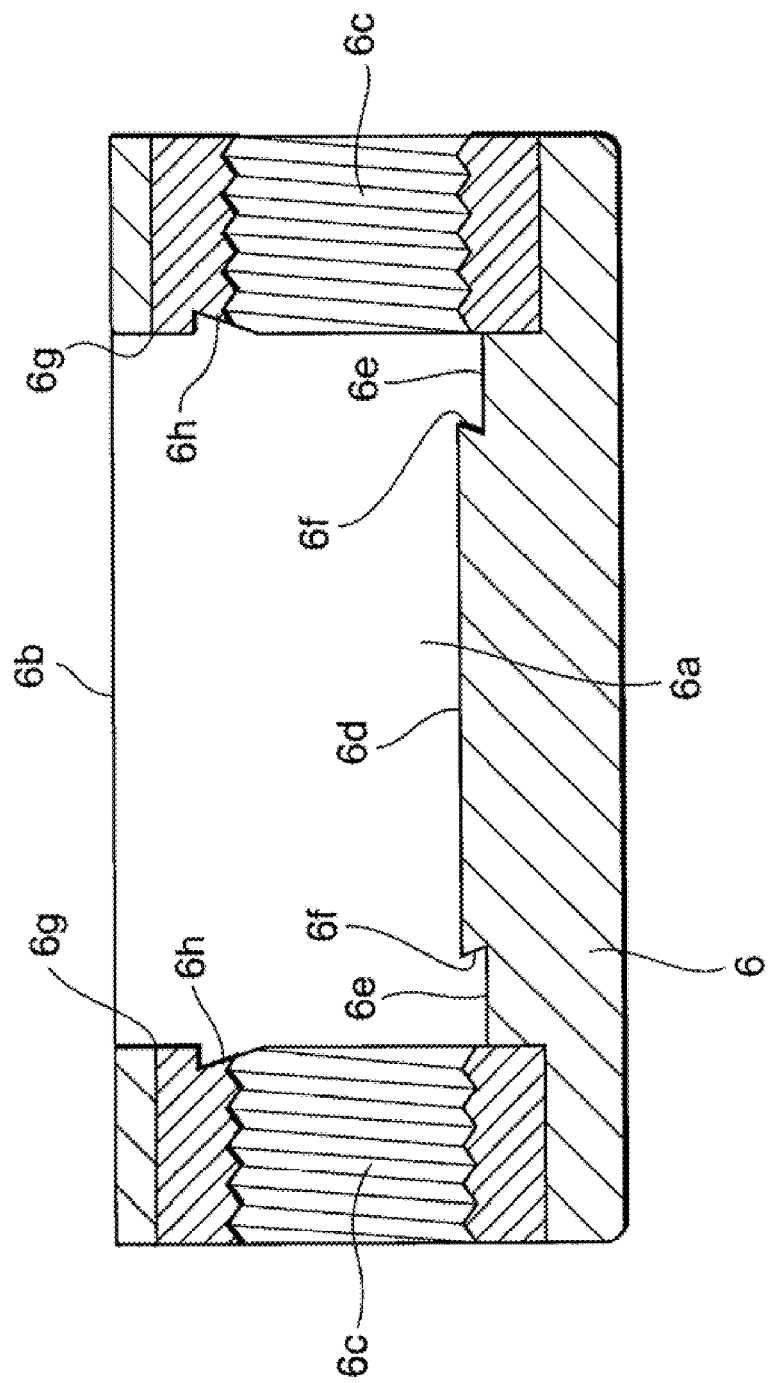
FIG. 4 is a cross-sectional diagram of the case when the flow path block of FIG. 3 is viewed along the direction IV-IV.

The flow path block 6 is a frame that is essentially a rectangular solid, as illustrated in FIG. 3 and FIG. 4, formed from metal, plastic, or the like. A flow path forming portion 6a, with a rectangular cross-sectional shape, is provided within the flow path block 6 extending in the form of a straight line from one end portion thereof to the other end portion thereof in the lengthwise direction. A rectangular opening portion 6b is provided on the top surface of the flow path block 6, where the flow path forming portion 6a is connected to the outside through this opening portion 6b.

As illustrated in FIG. 4, female screw portions 6c are formed on both ends, in the lengthwise direction, of the flow path forming portion 6a of the flow path block 6, at where male screw portions of external pipes (for example, the pipe P in FIG. 1) are screwed into these female screw portions 6c to connect the flow meter 2 to pipes. A lengthwise-direction center bottom portion 6d (the portion that is on the downward side opposite from the opening portion 6b) of the flow path forming portion 6a is structured so as to protrude slightly in the upward direction from the lengthwise-direction end bottom portions 6e.

Additionally, end surfaces 6f, wherein the lengthwise-direction center bottom portion 6d and the lengthwise-direction end bottom portions 6e of the flow path forming portion 6a are joined together (the portions that form the end surfaces of the sensor flow path portion 5a side of the wide diameter flow path portions 5b), as illustrated in FIG. 4, are formed so as to be in a slightly inclined state relative to the plane that is perpendicular to the direction in which the flow path forming portion 6a extends. These end surfaces 6f are disposed towards the inside (towards the center) from the position of the lengthwise-direction end edges 6g of the opening portion 6b of the flow path block 6. These end surfaces 6f contact lower portions of the flow rectifying plates 20a and 20b. Furthermore, in the neighborhood of the lengthwise-direction end edges 6g of the opening portion 6b of the flow path block 6, notched portions 6h are formed for engaging the upper portions of the flow rectifying plates 20a and 20b. The notched portions 6h have inclined surfaces that are parallel to the end surfaces 6f, and the top portions of the flow rectifying plates 20a and 20b contact these inclined surfaces.

The cover member 7 is a frame that is essentially a rectangular solid, as illustrated in FIG. 2, where a protruding portion 7a, shaped so as to block the opening portion 6b of the flow path block 6, is provided on the bottom surface thereof. The protruding portion 7a, as illustrated in FIG. 2, is formed with a lengthwise-direction center portion 7b protruding slightly below the lengthwise-direction end portions 7c. Inclined planes, formed so as to be parallel with the inclined planes of the notched portions 6h of the flow path block 6, are formed on angled portions 7d of the lengthwise-direction end portions 7c of the protruding portion 7a, where the upper portions of the flow rectifying plates 20a and 20b make contact with these inclined planes. The flow sensor 10 for detecting the flow speed or flow volume of the fluid that is flowing through the straight pipe-shaped flow path 5 is provided on the front side (the flow path block 6 side) of the lengthwise-direction center portion 7b of the protruding portion 7a. The structure and function of the flow sensor 10 will be described below.

A circuit board 8, on which various types of electric circuits are provided, is disposed within the cover member 7, where the circuit board 8 and the flow sensor 10 are connected electrically through electrodes that are provided on the back side (the interior side of the cover member 7) of the lengthwise-direction center portion 7b of the protruding portion 7a. Furthermore, a signal cable 9 is connected to the circuit board 8, where this signal cable 9 leads to the outside from an opening portion 7e that is formed in the cover member 7, to connect to the signal processing circuit 41 of the controlling means 4.

The cover member 7 is placed onto the top of the flow path block 6, to block the opening portion 6b of the flow path block 6 with the protruding portion 7a of the cover member 7, as illustrated in FIG. 2, to thereby form the straight pipe-shaped flow path 5. At this time, the sensor flow path portion 5a of the straight pipe-shaped flow path 5 is formed from the lengthwise-direction center portion 7b of the protruding portion 7a of the cover member 7 and the lengthwise-direction center bottom portion 6d of the flow path forming portion 6a of the flow path block 6. Additionally, the wide diameter flow path portion 5b of the straight pipe-shaped flow path 5 is formed from the lengthwise-direction end portions 7c of the protruding portion 7a of the cover member 7 and the end surfaces 6f and lengthwise-direction end bottom portions 6e of the flow path forming portion 6a of the flow path block 6.

Figure 7:
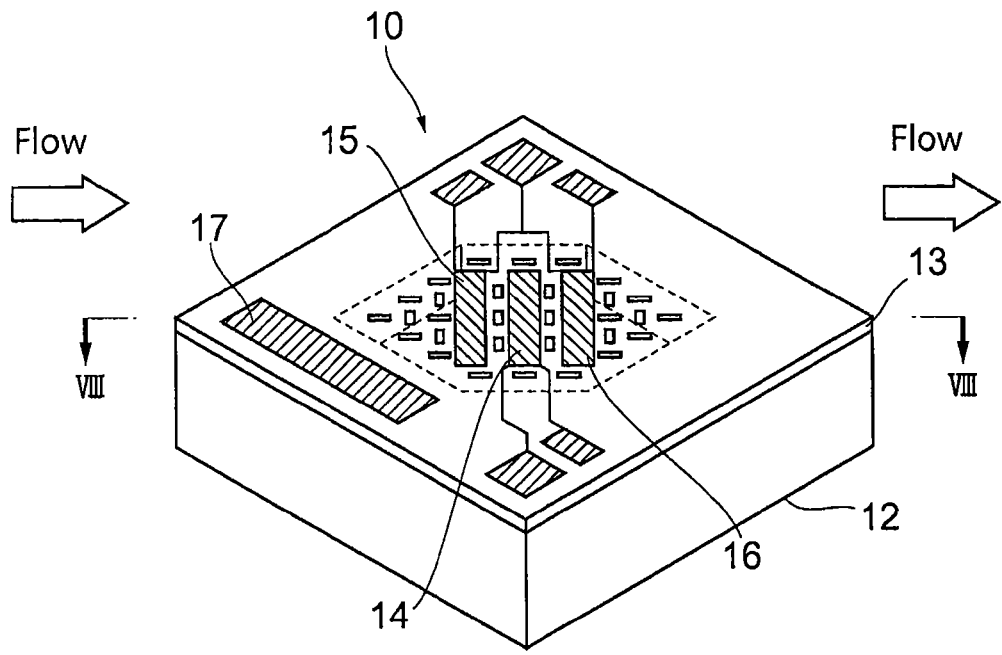
FIG. 7 is an oblique view of a flow sensor in the flow meter in FIG. 2.
Figure 8:
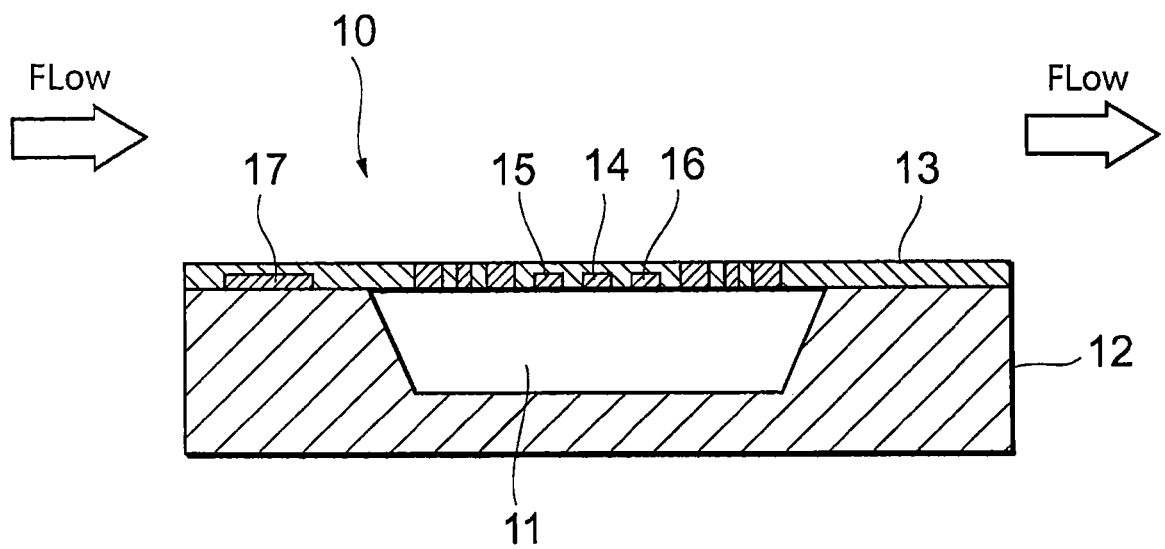
FIG. 8 is an end surface diagram of a case wherein the flow sensor in FIG. 7 is viewed along VIII-VIII.

The flow sensor 10, as illustrated in FIG. 7 and FIG. 8, has a substrate 12 provided with: a cavity 11; an insulating layer 13 that is disposed on the substrate 12 so as to cover the cavity 11; a heater 14, disposed on the insulating layer 13; an upstream-side temperature measuring resistance element 15, provided on the upstream side of the heater 14; a downstream-side temperature measuring resistance element 16, provided on the downstream side of the heater 14; and an ambient temperature sensor 17, provided on the upstream side of the upstream-side temperature measuring resistance element 15.

The portion of the insulating layer 13 that covers the cavity 11 is structured as a thermally insulating diaphragm. The ambient temperature sensor 17 measures the temperature of the fluid that flows in the straight pipe-shaped flow path 5, illustrated in FIG. 2. The heater 14 is disposed in the center of the insulating layer 13 that covers the cavity 11, and heats the fluid that flows in the straight pipe-shaped flow path 5 so as to reach a predetermined temperature (for example, 10° C.) that is higher than the temperature measured by the ambient temperature sensor 17. The upstream-side temperature measuring resistance element 15 is used in order to detect the temperature that is on the upstream side of the heater 14, and the downstream-side temperature measuring resistance element 16 is used to detect the temperature on the downstream side of the heater 14.

Here, if the fluid within the straight pipe-shaped flow path 5, illustrated in FIG. 2, is stationary, the heat that is applied by the heater 14, illustrated in FIG. 7 and FIG. 8, will diffuse symmetrically in the upstream direction and the downstream direction. Consequently, the temperatures of the upstream-side temperature measuring resistance element 15 and the downstream-side temperature measuring resistance element 16 will be equal, so the electrical resistances of the upstream-side temperature measuring resistance element 15 and the downstream-side temperature measuring resistance element 16 will be equal. In contrast, when the fluid in the straight pipe-shaped flow path 5 is flowing from upstream to downstream, the heat that is added by the heater 14 will be carried to the downstream side. Consequently, the temperature at the downstream-side temperature measuring resistance element 16 will be higher than the temperature at the upstream-side temperature measuring resistance element 15. Because of this, there will be a difference between the electrical resistance of the upstream-side temperature measuring resistance element 15 and the electrical resistance of the downstream-side temperature measuring resistance element 16. This difference between the electrical resistance of the downstream-side temperature measuring resistance element 16 and the electrical resistance of the upstream-side temperature measuring resistance element 15 will have a correlation relationship with the speed and flow volume of the fluid in the straight pipe-shaped flow path 5. Because of this, it is possible to calculate the flow speed and the flow volume of the fluid that is flowing in the straight pipe-shaped flow path 5 from the electrical resistance of the downstream-side temperature measuring resistance element 16 and the electrical resistance of the upstream-side temperature measuring resistance element 15.

Silicon (Si) or the like may be used as the material for the substrate 12 illustrated in FIG. 7 and FIG. 8. Silicon oxide ($SiO_2$) or the like may be used as the material for the insulating layer 13. The cavity 11 may be formed through anisotropic etching, or the like. Furthermore, platinum (Pt) may be used as the material for the heater 14, for the upstream-side temperature measuring resistance element 15, for the downstream-side temperature measuring resistance element 16, and for the ambient temperature sensor 17, and these may be formed through a lithographic method, or the like.

Figure 9:
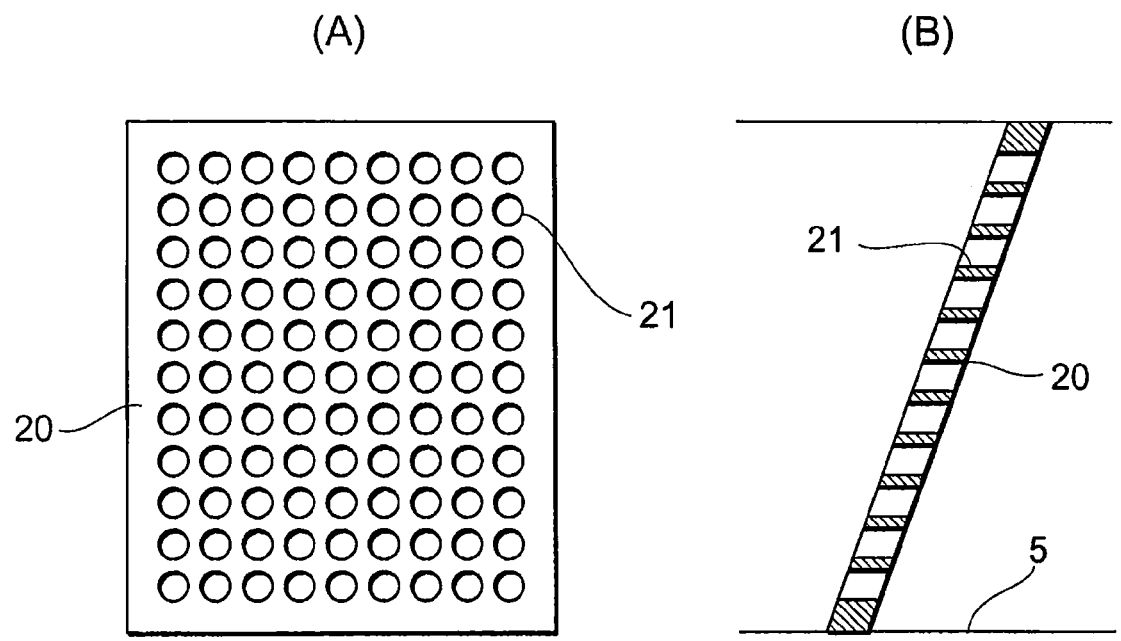
FIGS. 9A and 9B illustrate an examples of a flow rectifying plate (rectangular shape) in a flow meter according to the first form of embodiment of the present invention, where (A) is a diagram when viewed from the flow path upstream side, and (B) is a cross-sectional diagram when viewed from the side of the flow path.

The flow rectifier 20, as illustrated in FIG. 2, is disposed in the wide diameter flow path portion 5b of the straight pipe-shaped flow path 5, and fulfills the function of rectifying the measurement fluid (that is, the function of suppressing the turbulence within the measurement fluid). The flow rectifier 20 in the present form of embodiment is two flow rectifying plates 20a and 20b that are disposed on the upstream side and the downstream side of the sensor flow path portion 5a of the straight pipe-shaped flow path 5. The flow rectifier 20 (the flow rectifying plates 20a and 20b), as illustrated in FIG. 9 (a), has a flat rectangular shape so as to correspond with the cross-sectional shape of the straight pipe-shaped flow path 5, and a plurality of flow rectifying holes 21 are formed therein from the front side thereof penetrating to the back side thereof.

Figure 5:
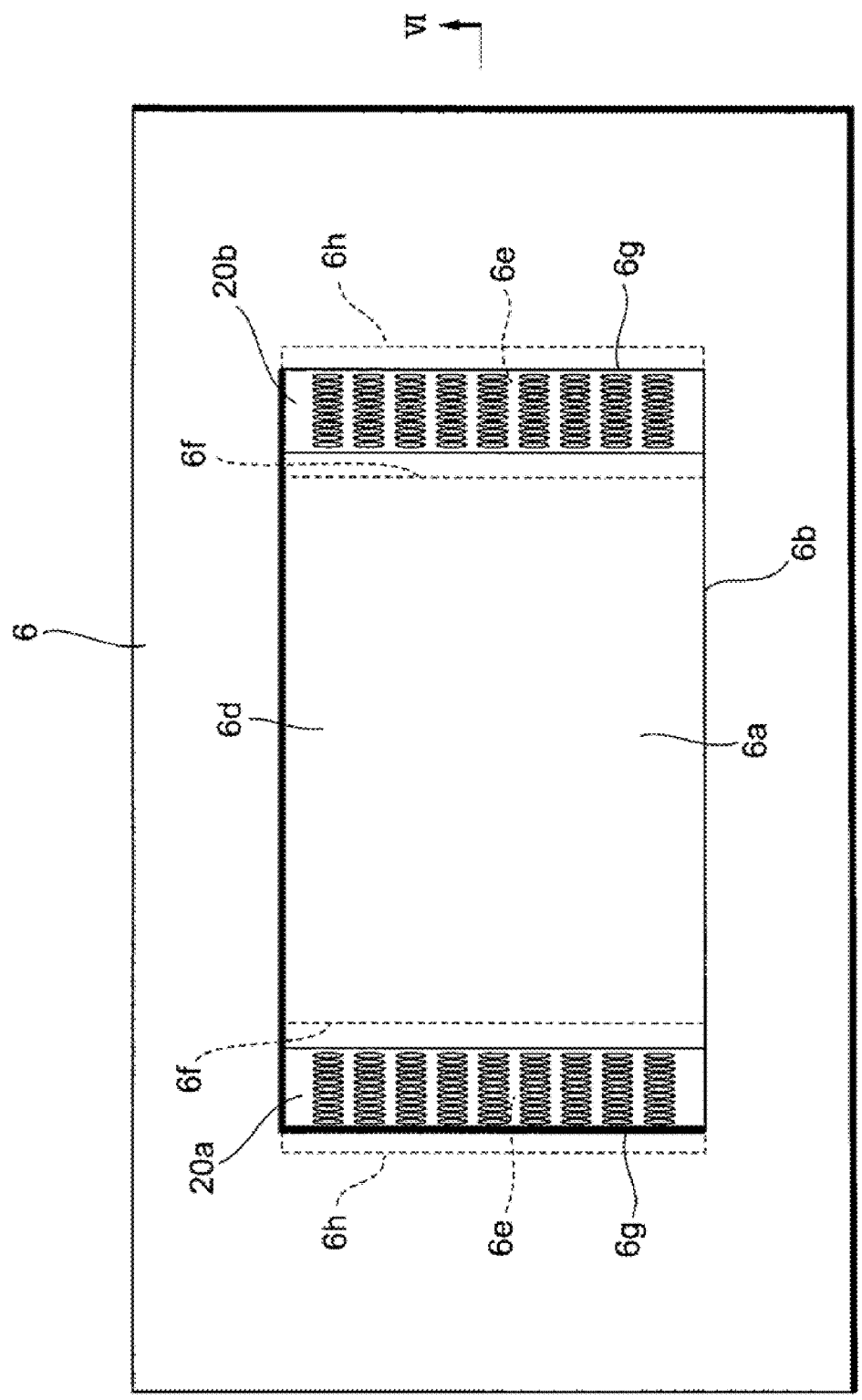
FIG. 5 is a top view diagram of a flow path block wherein the flow rectifier (flow rectifying plates) of the flow meter in FIG. 2 are disposed.
Figure 6:
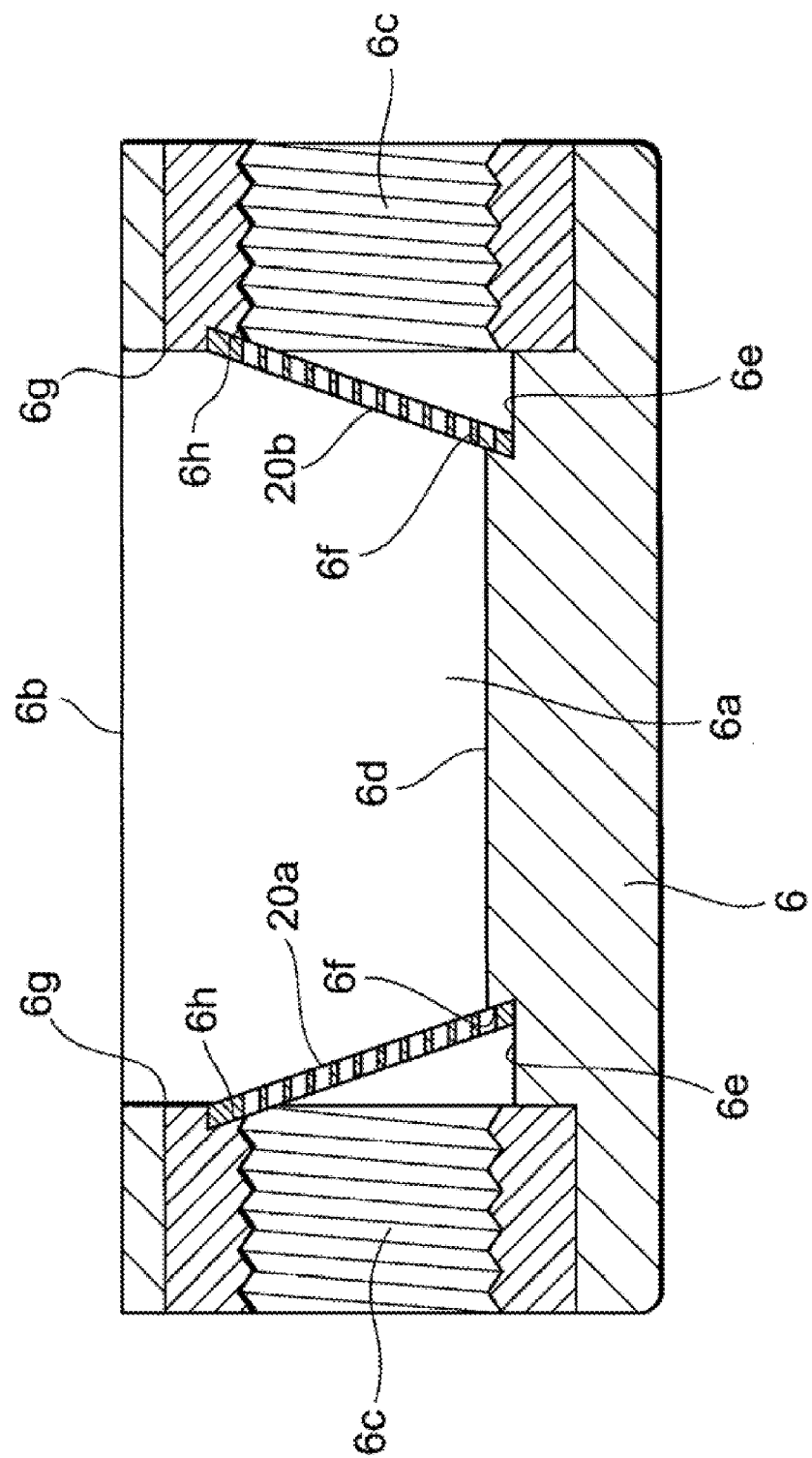
FIG. 6 is a cross-sectional diagram of the case wherein the flow path block wherein the flow rectifying plates of FIG. 5 are disposed is viewed along VI-VI.

The flow rectifier 20 (the flow rectifying plates 20a and 20b), as illustrated in FIG. 2 and FIG. 9(B), are disposed at an angle relative to the direction in which the straight pipe-shaped flow path 5 extends (that is, in a state that is not perpendicular to the direction in which the straight pipe-shaped flow path 5 extends). The state of disposition of the flow rectifying plates 20a and 20b will be described in specifics. The upper portions, which include portions of the peripheral surfaces, of the flow rectifying plates 20a and 20b, as illustrated in FIG. 2, FIG. 5, and FIG. 6, are disposed so as to contact (be held between) the inclined planes of the notched portion 6h, formed in the vicinity of the opening portion 6b of the flow path block 6, and the inclined plane of the angled portion 7d of the lengthwise-direction end portions 7c of the protruding portion 7a of the cover member 7 when the straight pipe-shaped flow path 5 is formed by blocking the opening portion 6b of the flow path block 6 with the protruding portions 7a of the cover member 7. On the other hand, the lower portions, including portions of the outer peripheral surfaces, of the flow rectifying plates 20a and 20b are disposed so as to make contact with the end surfaces wherein there is contact between the lengthwise-direction center bottom portion 6b of the flow path block 6 and the lengthwise-direction end bottom portions 6e (that is, the end surfaces on the sensor flow path portion 5a side of the wide diameter flow path portion 5b. These end surfaces 6f are disposed further towards the center than the notched portions 6h, and thus the flow rectifying plates 20a and 20b are disposed so as to be inclined towards the center further towards the bottom (that is, inclined so as to be further towards the outside the further up).

Note that the inclination angles for the flow rectifying boards 20a and 20b, the inclination angles for the inclined surfaces of the notched portions 6h formed in the vicinity of the opening portion 66b of the flow path block 6, the inclination angles of the inclined surfaces of the angled portions 7d of the lengthwise-direction end portions 7c of the protruding portion 7a of the cover member 7, and the inclination angles of the end surfaces 6f where the lengthwise-direction center bottom portion 6d and the lengthwise-direction end bottom portions 6e of the flow path block 6 make contact are all set to the exact same value. Additionally, the other portions on the outer peripheral surface of the flow rectifying plates 20a and 20b contact the inner wall that forms the flow path forming portion 6a of the flow path block 6. The result is that the flow rectifying plates 20a and 20b, on the outer peripheral surface thereof, contact the inner wall of the straight pipe-shaped flow path 5 around the entire periphery thereof, and the flow rectifying plates 20a and 20b are secured through being held between the inner wall of the flow path block 6 and the cover member 7.

The length and width dimensions (the plane surface shape) and thickness of the flow rectifying plates 20a and 20b, and the number, sizes, and shapes of the holes 21 that are formed in the flow rectifying plates 20a and 20b can be set as appropriate in accordance with the specifications, scope, type of measurement fluid, and so forth, of the flow meter 2. As illustrated in FIG. 9(A), flow rectifying plates of a rectangular shape that are 2.93 cm long×2.54 cm wide are used in the present form of embodiment. Additionally, 99 circular holes 21 (11 in the height direction×9 in the width direction), each with a diameter of 0.16 cm are used in the present form of embodiment, where the total opening surface area of all 21 holes together is 1.98 cm$^2$. Note that in the present form of embodiment, the flow rectifying plates having the rigidity of being relatively thick are formed through cutting, at an angle, a square prism member wherein a plurality of holes have been formed in advance through punching to extend in the lengthwise direction, wherein the upper portion and lower portion of the outer peripheral surface are cut at a slight incline (that is, are not exactly square to the main surface) as illustrated in FIG. 9(B). A stainless steel plate, or the like, may be used as the material for the flow rectifying plates 20a and 20b.

In the flow meter 2 according to the form of embodiment described above, the flow rectifier 20 (the flow rectifying plates 20a and 20b) may be secured disposed at "an angle" relative to the direction in which the straight pipe-shaped flow path 5 extends (that is, in a state that is not perpendicular to the direction in which the straight pipe-shaped flow path 5 extends). Consequently, the surface area of the flow rectifying plates 20a and 20b can be increased to more than when the flow rectifying plates are disposed in a state that is perpendicular to the direction in which the flow path extends, as has been done conventionally, enabling the number of holes formed in the flow rectifying plates 20a and 20b, and the total area thereof, to be increased.

Explaining in concrete terms, the flow rectifier 20 (the flow rectifying plates 20a and 20b) in the present form of embodiment enables the formation of two more ranks of holes in the lengthwise direction (18 holes) because of the increase in the dimension in the vertical direction, when compared to the square flow rectifying plate 100 with a vertical and horizontal dimension of 2.54 cm (with 81 holes, and an opening area of 1.63 cm$^2$) as illustrated in FIG. 10, wherein the flow rectifying plate 100 is disposed in a state that is perpendicular to the direction in which the flow path extends, with the effect that it is possible to increase the area of the opening by 0.35 cm$^2$. Consequently, it is possible to suppress the increase in pressure loss in the measurement fluid arising due to the flow rectifier, and also possible to obtain the flow rectifying effect. The result is that it is possible to increase the measurement accuracy of the flow volume of the measurement fluid.

Also, in the flow meter 2 according to the form of embodiment set forth above, the flow rectifying plates 20a and 20b are disposed so that the outer peripheral surfaces thereof contact the inner wall of the straight pipe-shaped flow path 5 around the entire periphery thereof, and thus the flow rectifying plates 20a and 20b can be secured reliably relative to the straight pipe-shaped flow path 5 through the force of friction that acts between the outer peripheral surfaces of the flow rectifying plates 20a and 20b and the inner wall of the straight pipe-shaped flow path 5. Additionally, because the outer peripheral surfaces of the flow rectifying plates 20a and 20b contact the inner wall of the straight pipe-shaped flow path 5 around the entire periphery thereof, it is possible to prevent the formation of gaps between the flow rectifying plates 20a and 20b and the straight pipe-shaped flow path 5.

Additionally, in the flow volume controlling device 1 according to the form of embodiment set forth above, the flow rectifying effect in the measuring fluid can be obtained while suppressing the increase in the pressure loss, and it is possible to increase the accuracy of the flow volume adjustment for the fluid due to the provision of the flow meter 2 that has high flow volume measurement accuracy.

Figure 11:
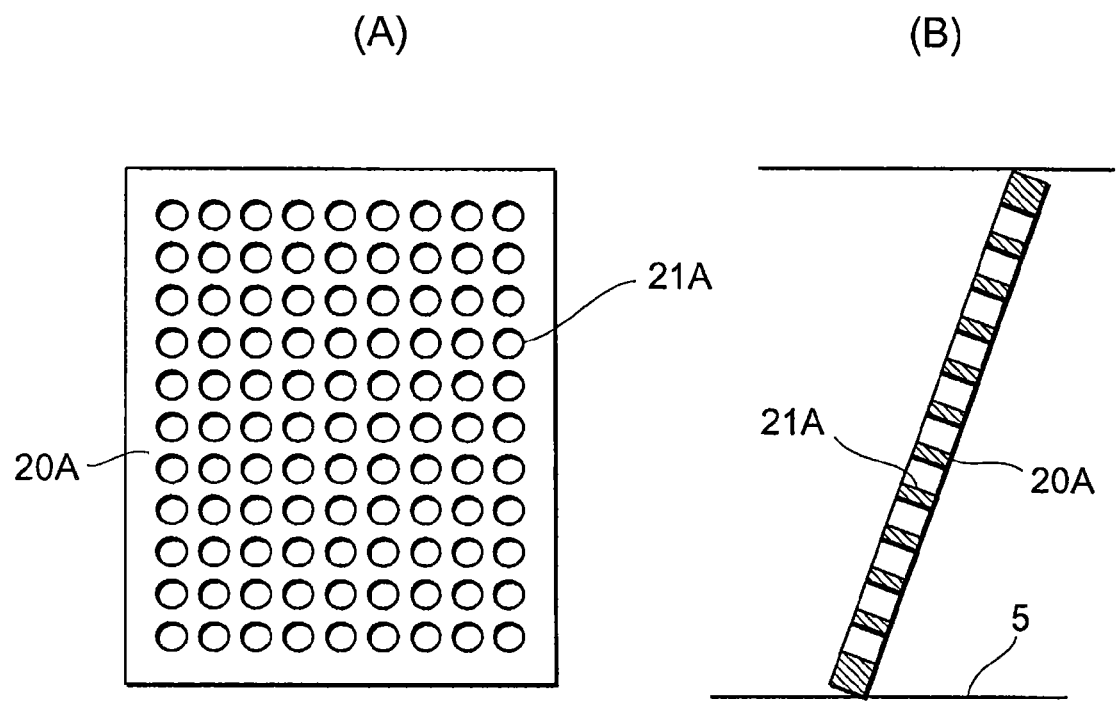
FIGS. 11A and B illustrate another example of a flow rectifying plate (rectangular) of a flow meter according to the first form of embodiment according to the present invention, where (A) is a diagram when viewed from the upstream side of the flow path, and (B) is a cross-sectional diagram when viewed from the side of the flow path.

Note that in the present embodiment, an example was illustrated wherein a flow rectifier 20 (flow rectifying plates 20a and 20b) wherein the top and bottom side surfaces were at a slight inclination angle, as illustrated in FIG. 9(B) through cutting, at an angle, of a rectangular prism member wherein holes have been formed in advance; however, instead a flow rectifying plate 20A as illustrated in FIGS. 11(A) and (B) may be manufactured through forming a plate-shaped member having holes 21A wherein the top and bottom portions of the outer peripheral surfaces have right angles relative to the primary plane, through performing a press process on the plate member.

Figure 12:
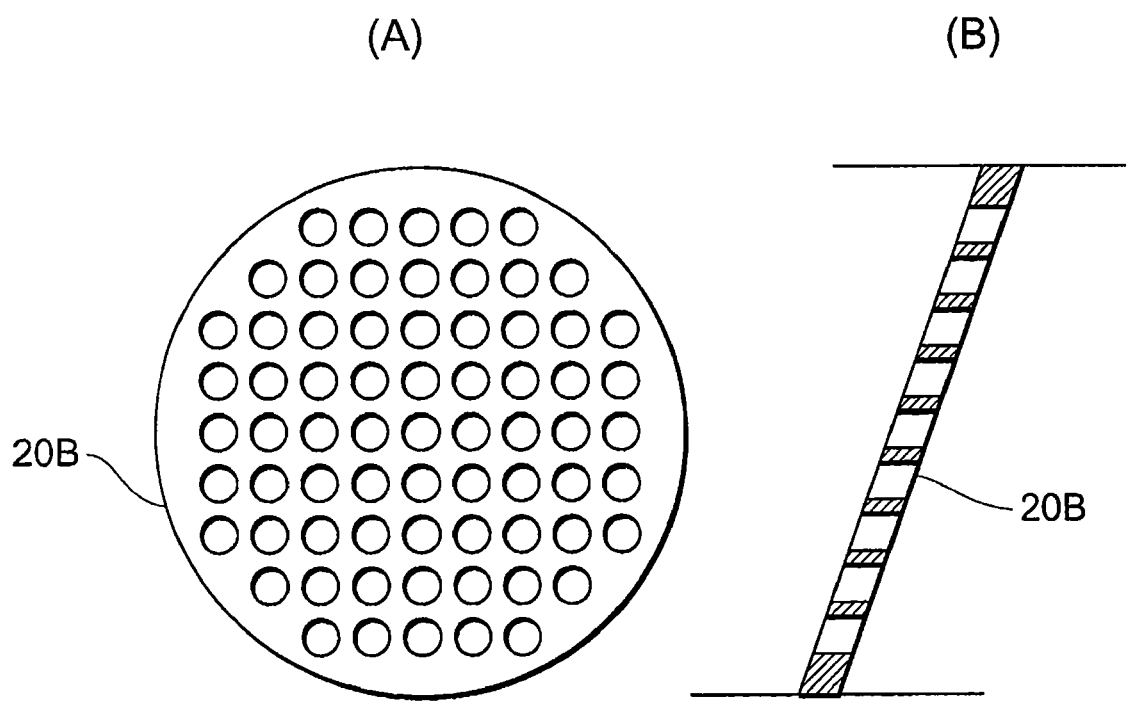
FIGS. 12A and 12B illustrate another example of a flow rectifying plate (circular) of a flow meter according to the first form of embodiment according to the present invention, where (A) is a diagram when viewed from the upstream side of the flow path, and (B) is a cross-sectional diagram when viewed from the side of the flow path.

Furthermore, while in the present form of embodiment an example was illustrated wherein a straight pipe-shaped flow path 5 with a cross-sectional rectangular shape was used, a straight pipe-shaped flow path with a cross-sectional circular shape may be used instead. In this case, it is possible to use a flow rectifying plate 20B wherein the plane shape is circular, as illustrated in FIGS. 12(A) and (B). Note that while the flow rectifying plate 20B with the circular shape, illustrated in FIGS. 12(A) and (B) can be manufactured through cutting, at an angle, a cylindrical member in which holes have been formed in advance, instead the flow rectifying plate with the circular shape can be manufactured through performing a press process on a plate member. Additionally, the cross-sectional shape of the flow path of the flow meter (and the plane shape of the flow rectifying plate corresponding thereto) may be a shape wherein straight lines and curved lines are combined.

Additionally, while in the form of embodiment set forth above an example was illustrated wherein the upper portions, including portions of the outer peripheral surfaces, of the flow rectifying plates 20a and 20b were disposed so as to be held between the notched portions 6h in the vicinity of the opening portion 6b of the flow path block 6 and the angled portions 7d of the lengthwise-direction ends of the protruding portion 7a of the cover member 7, so that the flow rectifying plates 20a and 20b are disposed so as to be inclined further towards the center the further in the downward direction, the state of disposition of the flow rectifying plates is not limited thereto.

Figure 13:
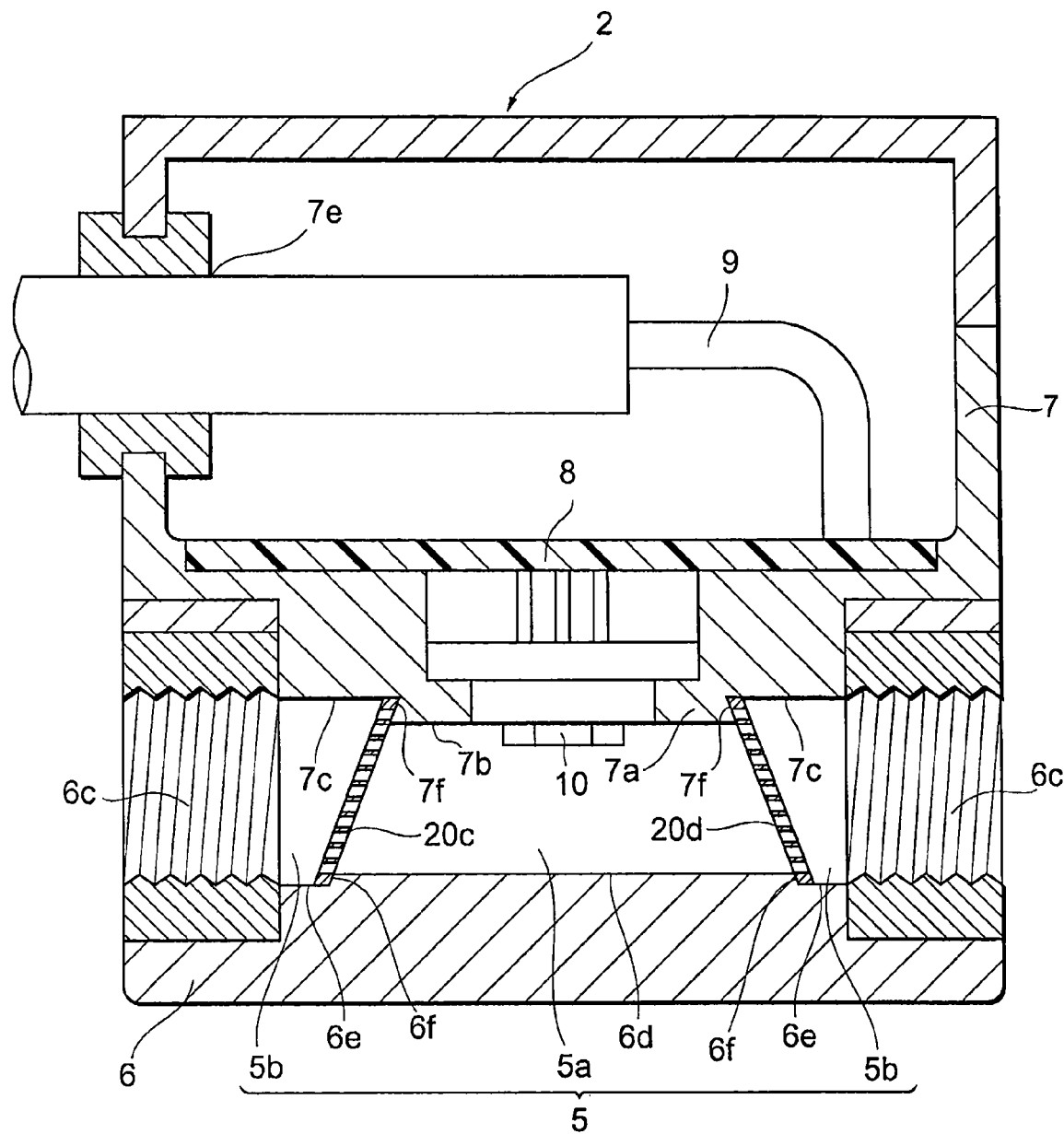
FIG. 13 is a cross-sectional diagram illustrating a modified example of the state of disposition of a flow rectifying plate in the flow meter according to the first form of embodiment according to the present invention.

For example, as illustrated in FIG. 13, it is possible to form end surfaces wherein the lengthwise-direction center portion 7b of the protruding portion 7a of the cover member 7 contacts the lengthwise-direction end portions 7c (the end surfaces of the wide diameter flow path portions 5b on the sensor flow path portions 5a side) to be angled slightly, relative to a vertical plane, in the direction in which the flow path forming portion 6a extends, and possible to cause the upper portions, including portions of the outer peripheral surfaces, of the flow rectifying plates 20c and 20d to contact the end surfaces 7f. In the modified example illustrated in FIG. 13, the end surfaces 7f of the protruding portion 7a of the cover member 7 are disposed further towards the center than the end surfaces 6f of the bottom portion of the flow path block 6, and the flow rectifying plates 20c and 20d are disposed so as to be inclined further towards the center the higher up (inclined so as to be further towards the outside the further down). Even in this case, the angles of inclination of the flow rectifying plates 20c and 20d, the angles of inclination of the end surfaces 7f of the protruding portion 7a of the cover member 7, and the angles of inclination of the end surfaces 6f of the bottom portion of the flow path block 6 can all be set to identical values.

Furthermore, while in the present embodiment, an example is illustrated wherein the positions of the upper portions of the flow rectifying plates 20a and 20b and the positions of the lower portions thereof being different in the direction in which the straight pipe-shaped flow path extends, to thereby dispose the flow rectifying plates 20a and 20b at angles relative to the direction in which the straight pipe-shaped flow path 5 extends, the state of disposition of the flow rectifying plates is not limited thereto. For example, by having the position of the front portion of the flow rectifying plate (for example, the portion that is on the front side of the surface of the paper in FIG. 2) and at the position of the back portion (the portion to the rear of the surface of the paper in FIG. 2) be different in the direction in which the straight pipe-shaped flow path extends, the flow rectifying plates can be disposed at angles relative to the direction in which the straight pipe-shaped flow path extends.

Additionally, while in the present form of embodiment an example is illustrated wherein flow rectifying plates 20a and 20b (for measuring medium flow volumes and large flow volumes) having the rigidity of relative thickness and wherein holes 21 were formed through punching a plate-shaped member were used, thin flow rectifying plates (for measuring extremely small flow volumes), wherein holes are formed through etching a thin plate, may be used instead. While, in the present embodiment, an example is illustrated wherein flow rectifying plates 20a and 20b wherein a plurality of holes are formed in plate-shaped members are used, flow rectifying plates that use a mesh-shaped metal net or flow rectifying plates wherein a plurality of slits are formed may be used instead.

Additionally, while in the present form of embodiment an example is illustrated wherein the flow rectifying plates are disposed on both the upstream side and the downstream side of the flow sensor 10, instead a flow rectifying plate may be disposed on the upstream side of the flow sensor 10 alone. Additionally, if necessary, three or more flow rectifying plates may be provided. Additionally, while in the present embodiment an example is illustrated wherein a flat flow rectifying plate (having a cross-sectional shape resembling the letter "I") is used, instead a flow rectifying plate having a cross-sectional shape resembling a ">" (or a shape wherein a plurality of ">" symbols are connected together) may be used.

Figure 14:
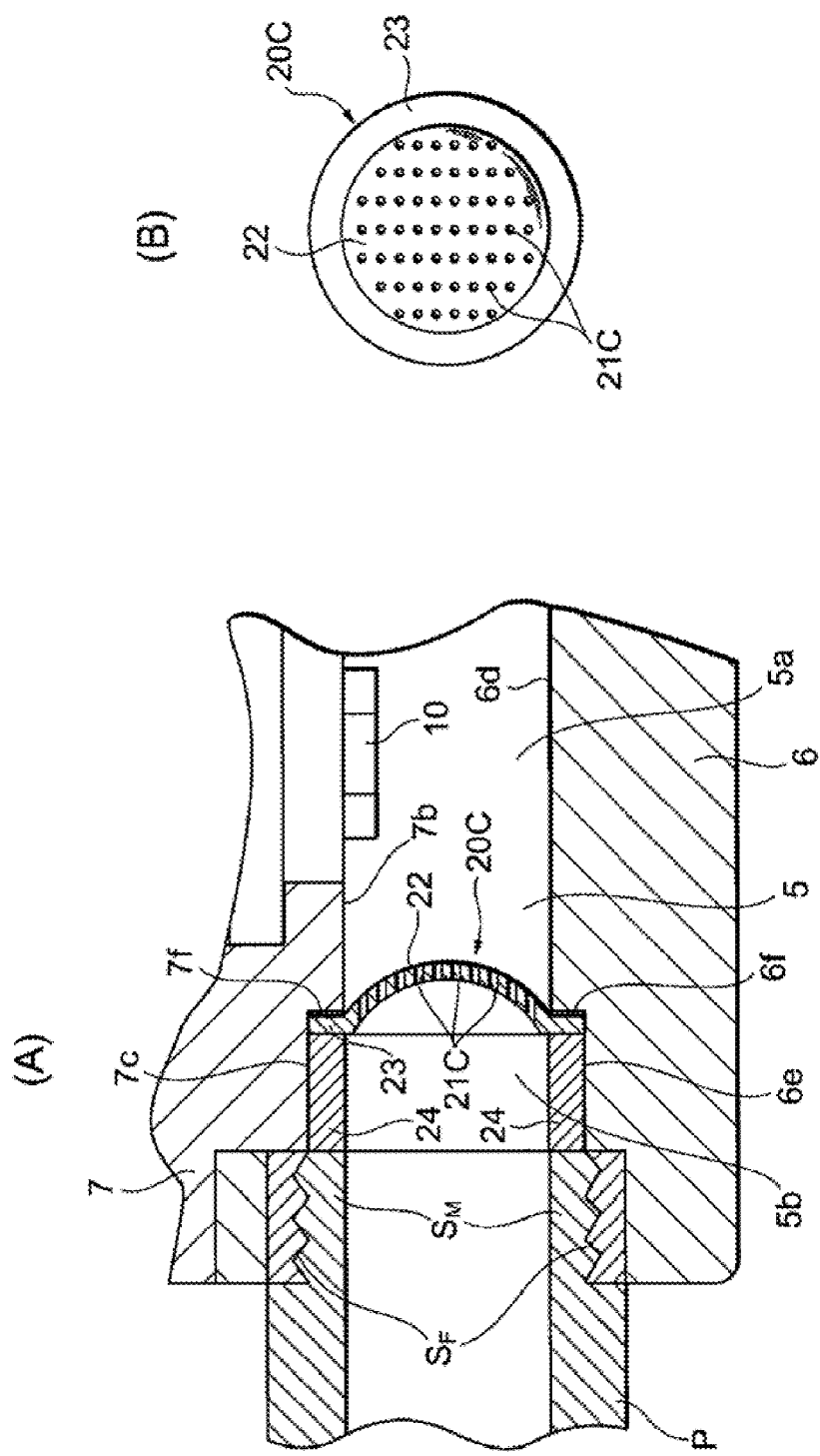
FIGS. 14A and 14B illustrate modified examples of a flow rectifier (colander shaped) of a flow meter according to the first form of embodiment according to the present invention.

Furthermore, while in the present embodiment an example is illustrated wherein two flow rectifying plates were used as the flow rectifier, the structure of the flow rectifier is not limited thereto, but rather all that is needed is to have a larger surface area than the cross-sectional area of the flow path in the direction that is perpendicular to the direction in which the flow path extends. For example, the colander-shaped flow rectifier 20C, as illustrated in FIGS. 14(A) and (B), may be used. The colander-shaped flow rectifier 20C has a flow rectifying portion 22 that is formed so as to bulge out in one direction in the direction in which the flow path 5 extends (for example, the downstream direction), and wherein a large number of holes 21C for a flow rectification are formed, and also has a flat flange portion 23 that is connected to the peripheral edge of the flow rectifying portion 22. This flow rectifying portion 22 has a curved surface shape (such as a portion of a spherical surface), as in a tea filter or a colander, and has a larger area than the flow path cross-sectional area in a direction that is perpendicular to the direction in which the flow path 5 extends. The flange portion 23 is disposed so as to contact the end surface of the wide diameter flow path portion 5b on the sensor flow path portion 5a side (the end surfaces 6f wherein the lengthwise-direction center bottom portion 6d and the lengthwise-direction end bottom portions 6e of the flow path block 6 connect, and the end surfaces 7f wherein the lengthwise-direction center portion 7b and the lengthwise-direction end portions 7c of the protruding portion 7a of the cover member 7 connect).

When this type of colander-shaped flow rectifier 20C is used, then, as illustrated in FIG. 14(A), not only is a fastening member 24 disposed adjacent to the flange portion 23 of the flow rectifier 20C, but also female screw portions $S_F$ are formed in the inner walls of the lengthwise-direction end portions of the wide diameter flow path portions 5b of the flow path 5. The male screw portions $S_M$ of external pipes P are screwed into the female screw portions $S_F$ of the flow path 5, so that the fastening member 24 will be pushed against the flange portion 23 of the flow rectifier 20C by the end portion of the male screw portion $S_M$, thereby enabling the flange portion 23 of the flow rectifier $20_C$ to be secured by being held between the fastening member 24 and the end surface of the sensor flow path portion 5a of the wide diameter flow path portion 5b.

FIG. 15 through FIG. 20 will be used next to explain a flow volume controlling device 1A according to another embodiment according to the present invention. The flow volume controlling device 1A as set forth in the embodiment has a modification to the structure of the flow meter 2 in the flow volume controlling device 1 according to the previous embodiment, where the other structures are essentially identical to those in the first form of embodiment. Because of this, the explanation will center on the structures that are different, and the same codes are applied to those reputed structures as in the previous embodiment, and detailed explanations thereof are omitted.

Figure 15:
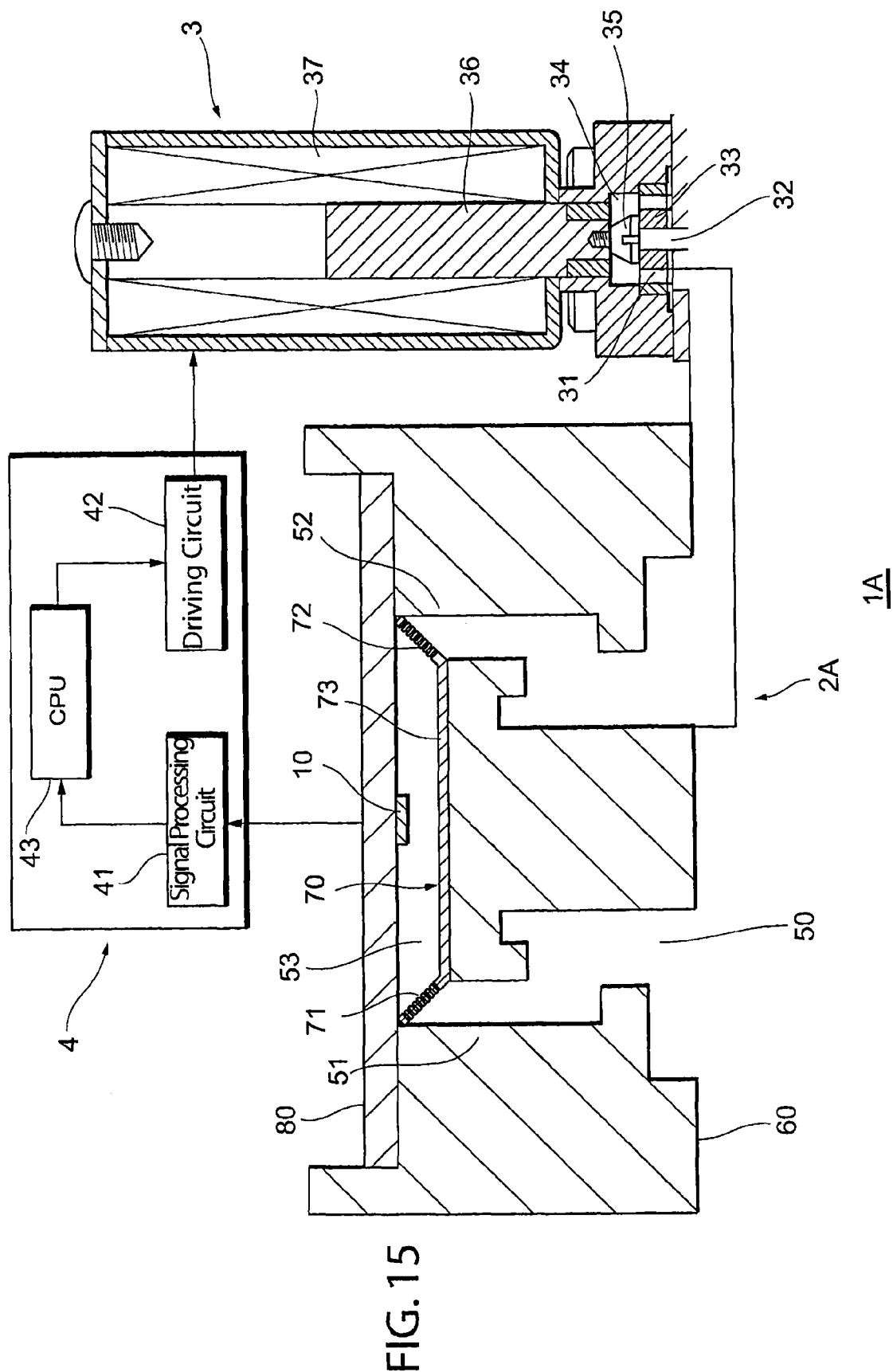
FIG. 15 is a schematic structural diagram for explaining the structure of a flow volume controlling device according to a second form of embodiment according to the present invention.

The flow volume controlling device 1A according to the present embodiment, as illustrated in FIG. 15, includes: a flow meter 2A for measuring the flow volume of a fluid; a controlling valve 3 for adjusting the flow volume of the fluid; and controlling means 4 for controlling the controlling valve 3. The flow meter 2A is a flow meter according to an embodiment according to the present invention, and has flow paths that are shaped as curves (curved flow paths). The structures of the controlling valve 3 and the controlling means 4 are essentially identical to those in the above embodiment, and hence explanations thereof will be omitted. Note that FIG. 15 is a schematic structural diagram illustrating the connection of the flow meter 2A to the controlling valve 3 through a flow path. Because of this, the structure of the flow path for connecting the flow meter 2A and the controlling valve 3, and the positional relationship between the flow meter 2A and the controlling valve 3, are not limited to that which is shown in FIG. 15, but rather may be modified as appropriate.

Figure 16:
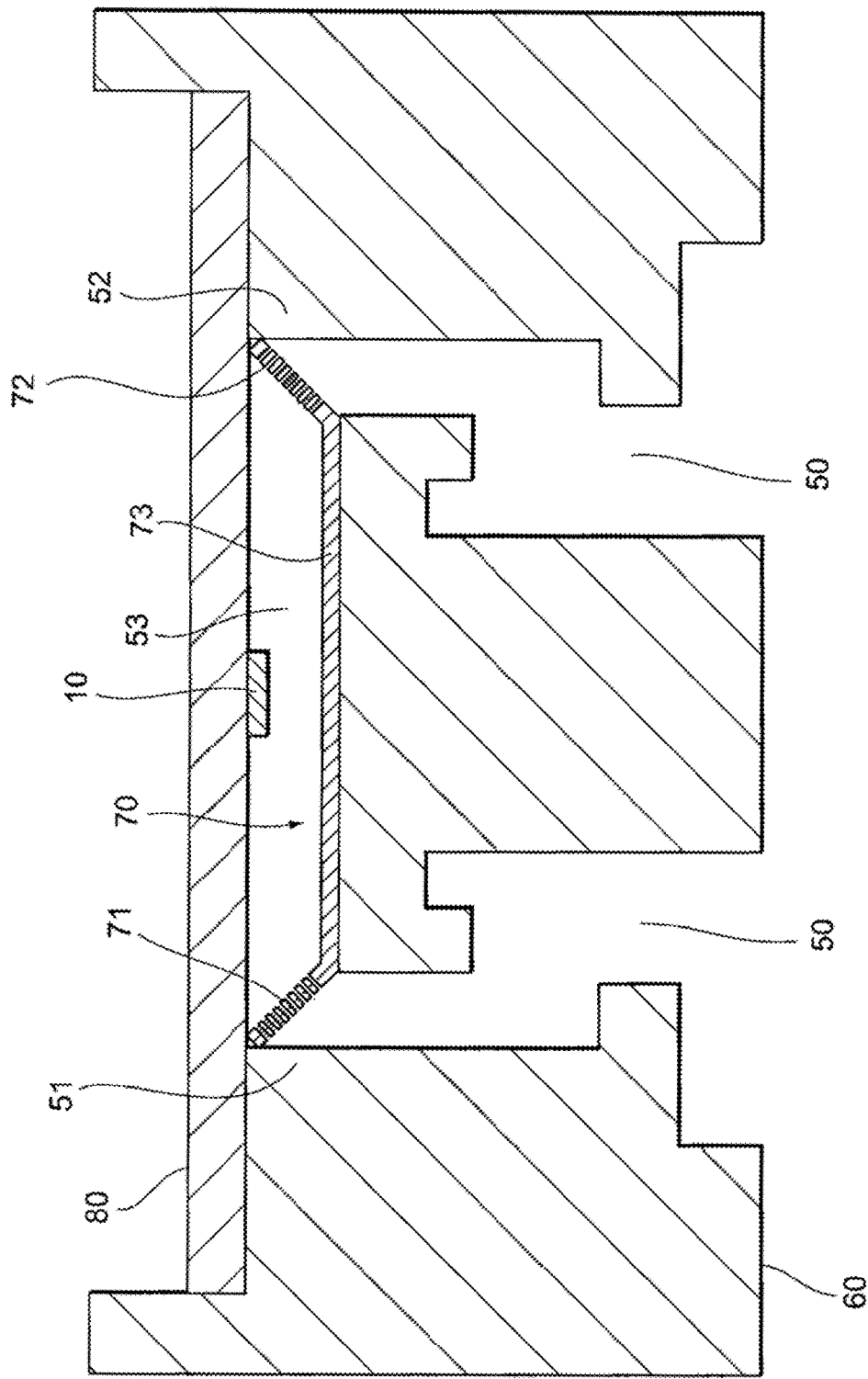
FIG. 16 is an end surface diagram of a flow meter (having a curved flow path) according to the second form of embodiment according to the present invention.

The flow meter 2A, as illustrated in FIG. 16, is equipped with a flow path block 60, a flow rectifier 70, and a flow sensor 10. The flow path block 60 has a curved flow path 50, where this curved flow path 50 is curved at a first curved portion 51 and a second curved portion 52, where there is a straight line shape in a constant direction extending between the first and the second curved portions 51 and 52. The flow rectifier 70 has a first flow rectifying plate 71 and a second flow rectifying plate 72. These first flow rectifying plate 71 and second flow rectifying plate 72 are positioned within the curved flow path 50, at an angle relative to the constant direction, in the respective first curved portion 51 and second curved portion 52. The flow sensor 10 is disposed on the inner wall of a flow path portion (the sensor flow path portion 53) between the first and second curved portions 51 and 52, and detects the flow speed or flow volume of a fluid that flows in the curved flow path 50.

Figure 17:
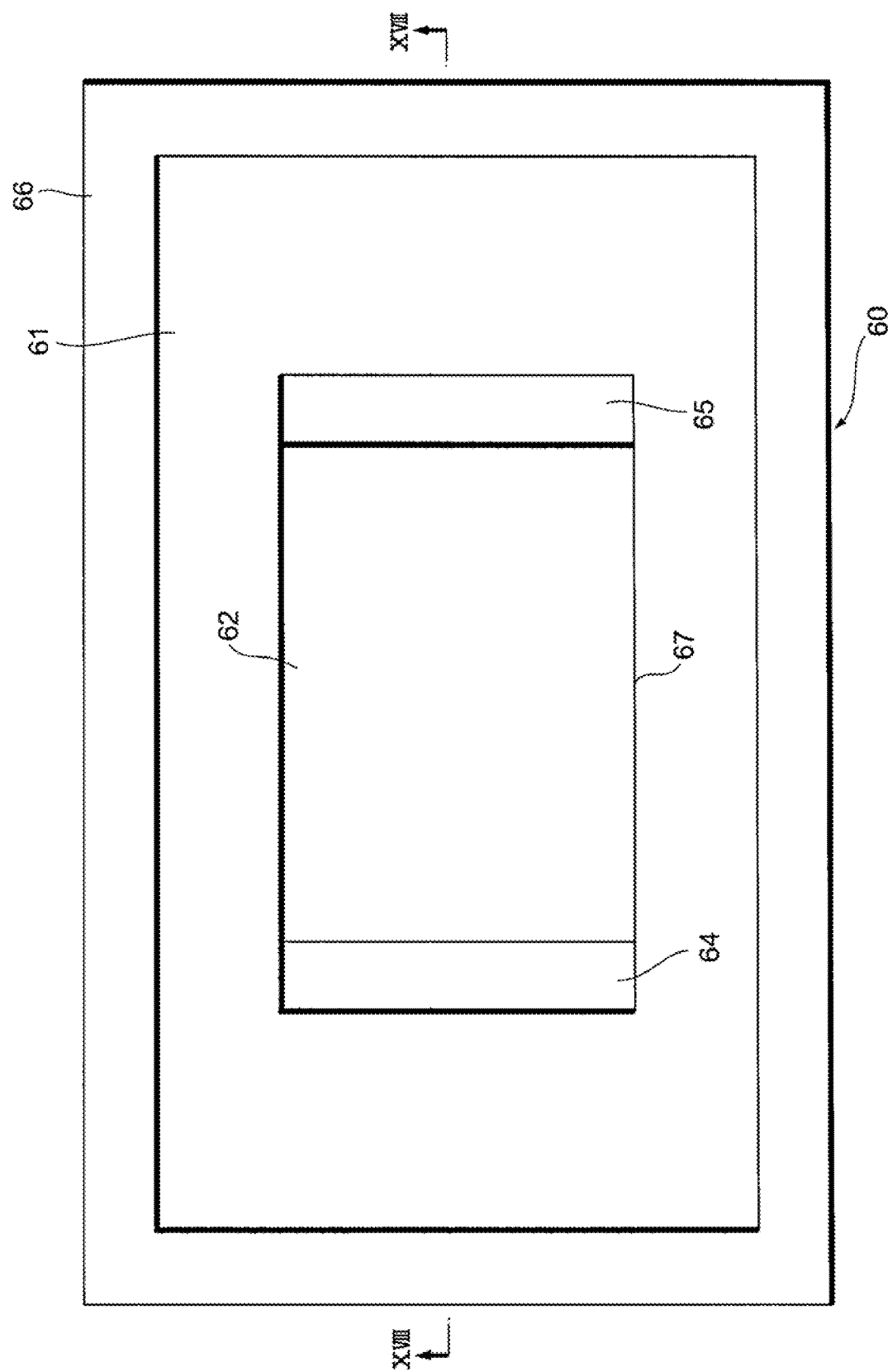
FIG. 17 is a top view diagram of the flow path block of the flow meter of FIG. 16.
Figure 18:
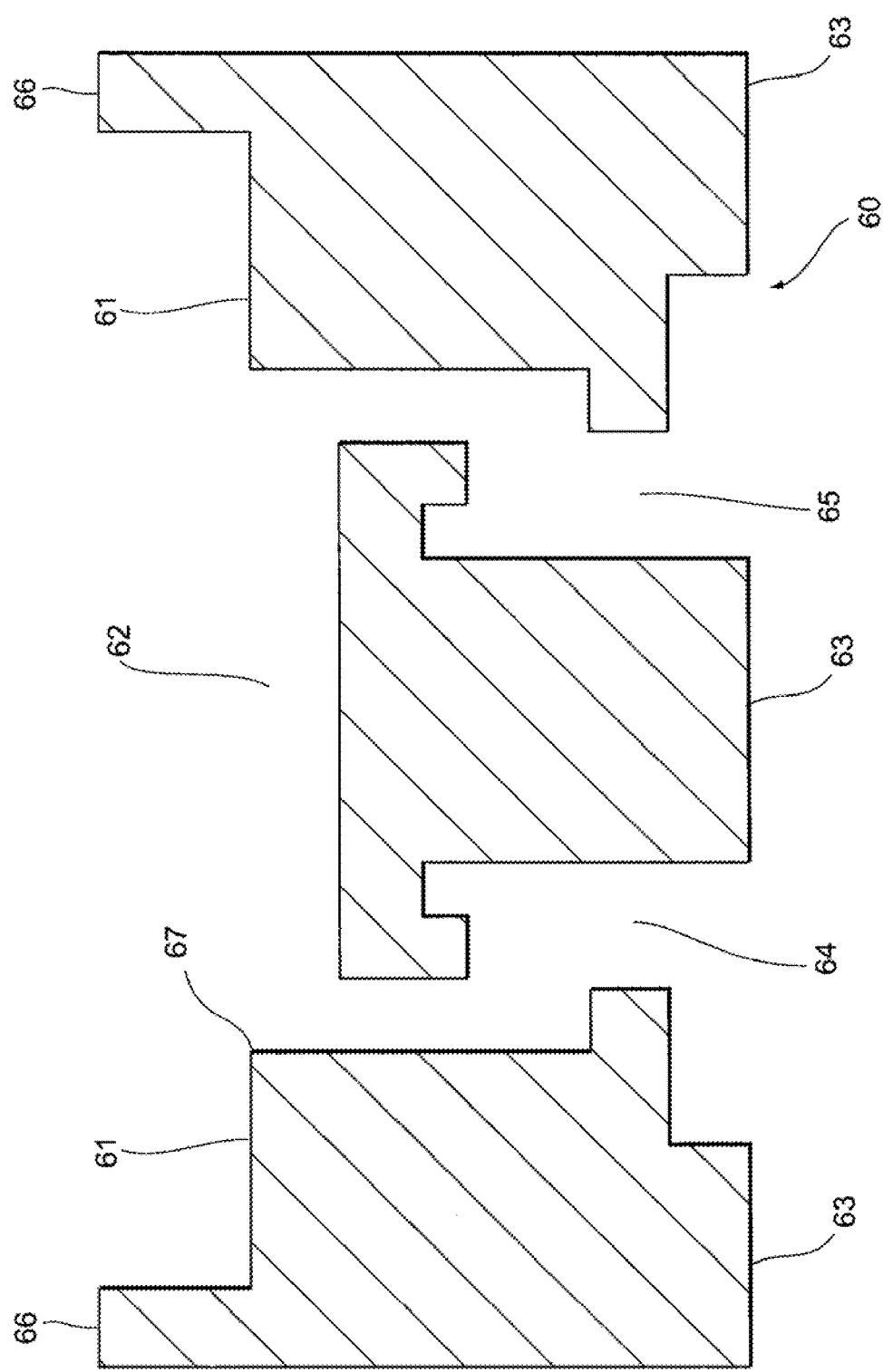
FIG. 18 is an end surface diagram of the case when the flow path block in FIG. 17 is viewed from XVIII-XVIII.

As illustrated in FIG. 17 and FIG. 18, an indented portion 62 corresponding to the sensor flow path forming portion in the present invention is provided on a top surface 61 of the flow path block 60. Moreover, through holes 64 and through holes 65 are formed from the bottom surface of the lengthwise-direction ends of the indented portion 62, towards the bottom surface 63 of the flow path block 60. The cross-sectional shapes of the through holes 64 and through holes 65 are, for example, rectangular. However, they are not limited to being rectangular, but instead may be shapes that combine straight lines and curved lines. A frame 66 is provided so as to encompass the indented portion 62 at the outer periphery of the top surface 61 of the flow path block 60. A metal, a plastic, or the like, may be used as the material for the flow path block 60.

As illustrated in FIG. 16, a circuit board 80 is disposed on the top surface 61 of the flow path block 60 so as to block an opening portion 67 of the indented portion 62. As illustrated in FIG. 17 and FIG. 18, the curved flow path 50 is structured from the through holes 64 and 65 provided in the flow path block 60 and the indented portion 62 that is covered by the circuit board 80. The area above the through holes 64, provided in the indented portion 62 that is covered by the circuit board 80, forms the first curved portion 51, illustrated in FIG. 16, where the curved flow path 50 is curved to a right angle at the first curved portion 51. Additionally, the area above the through holes 65 that are provided in the indented portion 62 that is covered by the circuit board 80 forms the second curved portion 52 illustrated in FIG. 16, where the curved flow path 50 is curved again to a right angle by the second curved portion 52. In the present embodiment, the first curved portion 51 side of the curved flow path 50 is defined as upstream from the curved flow path 50, and the second curved portion 52 side of the curved flow path 50 is defined as downstream from the curved flow path 50.

The flow sensor 10 is disposed on the bottom surface of the circuit board 80 that functions as the inner wall of the curved flow path 50 between the first curved portion 51 and the second curved portion 52. The structure of the flow sensor 10 is essentially identical to that in the above embodiment, so the explanation thereof is omitted. Electrodes for an electric circuit (not shown), for connecting to an electric circuit that performs the measurement principle using the flow sensor 10, are provided on the top surface of the circuit board 80. Additionally, the circuit board 80 is disposed so that the circuit board 80 blocks the opening portion 67 of the flow path block 60, and so that the flow sensor 10 of the circuit board 80 will face the sensor flow path portion 53 of the curved flow path 50.

Figure 19:
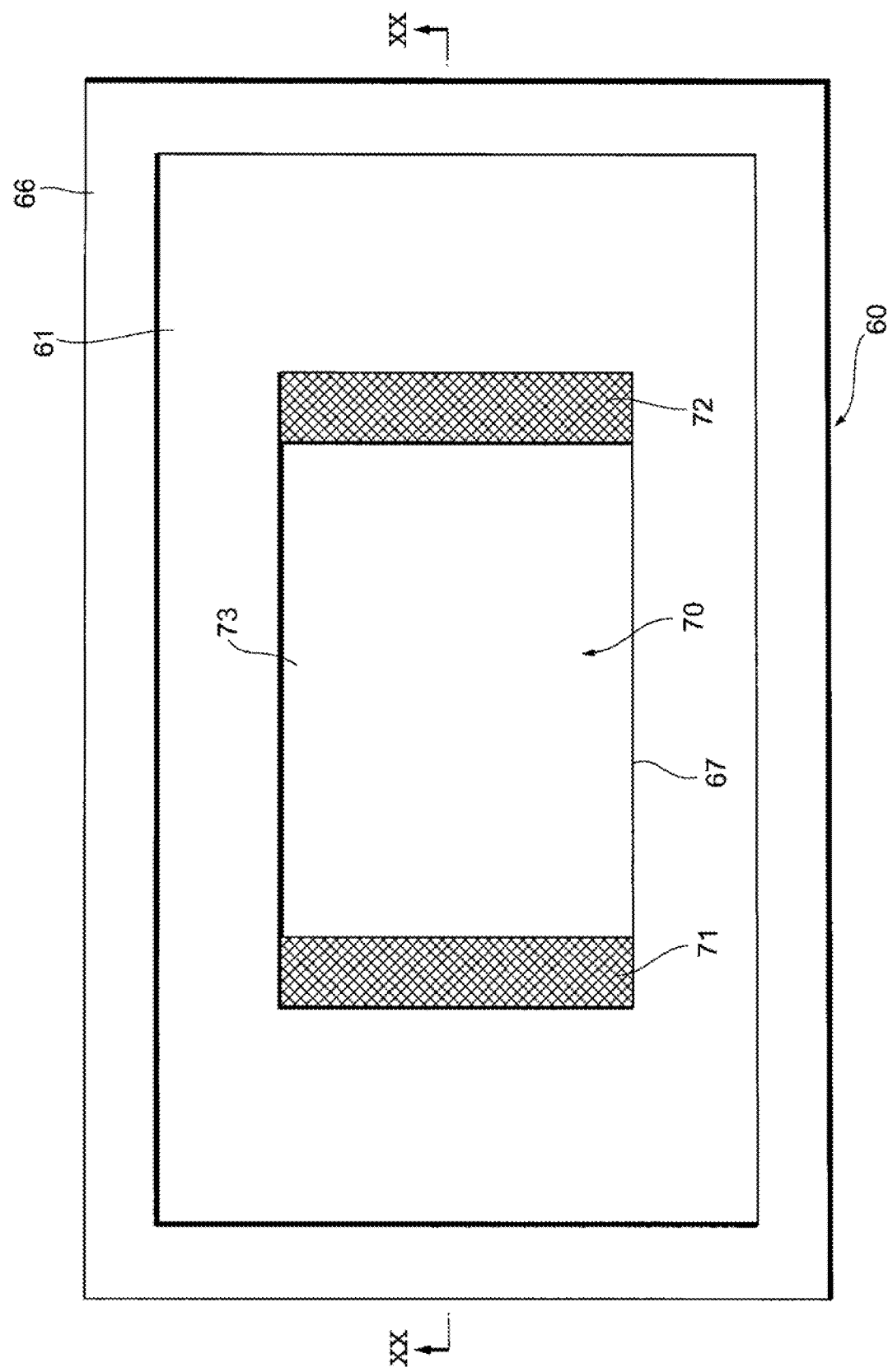
FIG. 19 is a top view diagram of a flow path block wherein a flow rectifying plate is disposed in the flow meter in FIG. 16.
Figure 20:
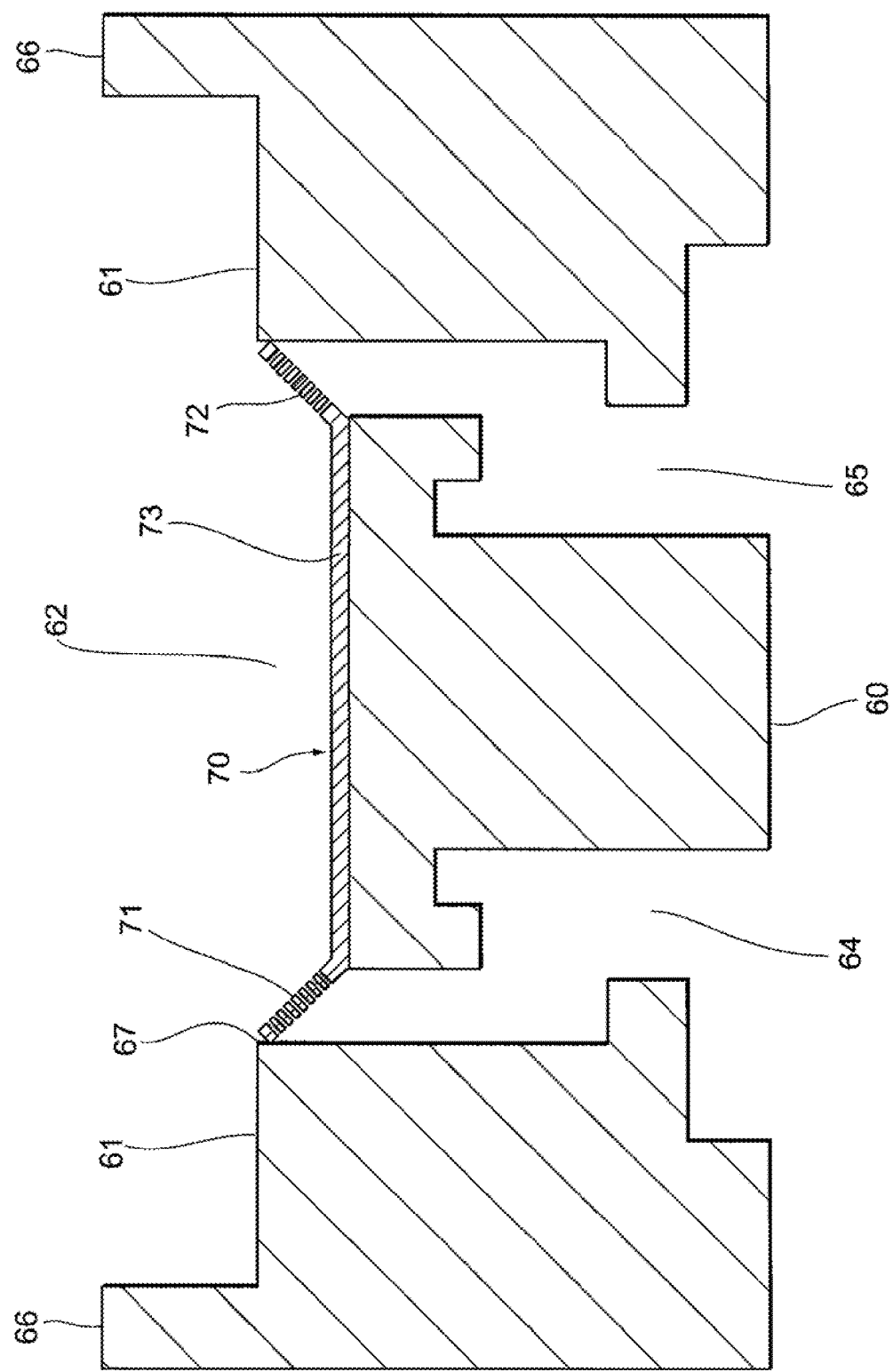
FIG. 20 is an end surface diagram of the case wherein the flow path block wherein the flow rectifying plate of FIG. 19 is disposed is viewed from XX-XX.

The flow rectifier 70 has first and second flow rectifying plates 71 and 72 and a flat plate 73 that is connected to the first and second flow rectifying plates 71 and 72, disposed therebetween. The flat plate 73 of the flow rectifier 70 has a rectangular shape for the plane shape thereof, as illustrated in FIG. 19, and, as illustrated in FIG. 20, is disposed so as to not block the through holes 64 and 65 at the flat bottom surface of the indented portion 62 of the flow path block 60. The width of the indented portion 62 of the flow path block 60 and the width of the flat plate of the flow rectifier 70 are essentially identical dimensions, where the side surface of the flat plate 73 is in contact with the inner wall of the indented portion 62. Because of this, the flat plate 73 is secured at the bottom surface of the indented portion 62 by the force of friction that operates between the inner wall of the indented portion 62 of the flow path block 60 and the side surface of the flat plate 73 of the flow rectifier 70.

The first and second flow rectifying plates 71 and 72 of the flow rectifier 70 have plane shapes that are rectangular shapes, and, as illustrated in FIG. 20, are connected at an angle relative to the flat plate 73 (that is, in a state that is not perpendicular). The first and second flow rectifying plates 71 and 72 are connected on one edge to one edge of the flat plate 73, and are connected on the other three edges to the inner wall of the indented portion 62 of the flow path block 60. Additionally, the upper portions of the outer peripheral surfaces of the first and second flow rectifying plates 71 and 72 are connected to the bottom surface of the circuit board 80. Because of this, the first and second flow rectifying plates 71 and 72 are secured so as to cover, at an angle, the through holes 64 and 65 (openings) that are provided in the bottom surface of the indented portion 62 by the force of friction that acts between the flow path block 60, the circuit board 80, and the outer peripheral surfaces of the first and second flow rectifying plates 71 and 72.

A large number of holes is provided in the first and second flow rectifying plates 71 and 72 of the flow rectifier 70. The height and width dimensions (the plane surface shapes) and the thicknesses of the first and second flow rectifying plates 71 and 72, and the number of holes, and the sizes and shapes thereof, formed in the first and second flow rectifying plates 71 and 72, can be set as appropriate depending on the specifications, scope, type of measurement fluid, and the like, of the flow meter 2A. In the present form of embodiment, mesh-shaped flow rectifying plates are used as the first and second flow rectifying plates 71 and 72. The flat plate 73, and the first and second flow rectifying plates 71 and 72 may be integrated together. The flat plate 73 and the first and second flow rectifying plates 71 and 72 may be provided with a large number of holes by etching the end portion of, for example, a stainless steel web, and can be obtained through bending the end portion. When forming the bend, the bending may be performed so that a large number of holes remain in a portion of the flat plate 73.

In the flow meter 2A according to the form of embodiment set forth above, the first and second flow rectifying plates 71 and 72 that structure the flow rectifier 70 can be disposed and secured at an "angle" relative to the direction in which the sensor flow path portion 53 of the curved flow path 50 extends (or in other words, in a state that is not perpendicular to the direction in which the sensor flow path portion 53 extends). Because of this, it is possible to cause the area of the flow rectifying plates 71 and 72 to be greater than when the rectifying plates are disposed in a state that is perpendicular to the direction in which the flow path extends, as has been done conventionally, and possible to increase the number of holes for flow rectification, and the total area thereof, formed in the flow rectifying plates 71 and 72. Consequently, it is possible to suppress any increase in the pressure loss of the measurement fluid caused by the flow rectifier 70, while still possible to obtain the flow rectifying effect. The result is that it is possible to increase the measurement accuracy of the flow volume of the measurement fluid.

Furthermore, in the flow meter 2A of the form of embodiment set forth above, the flow rectifier 70 is disposed so as to contact the inner wall of the curved flow path 50 on three edges of the flow rectifying plates 71 and 72 that structure the flow rectifier 70, and on the side surface of the flat plate 73 that structures the rectifier 70, thus making it possible to secure the flow rectifier 70 relative to the curved flow path 50 reliably through the force of friction that acts between the flow rectifying plates 71 and 72 and the flat plate 73, and the inner wall of the curved flow path 50.

Additionally, in the flow meter 2A according to the form of embodiment set forth above, in the state wherein the flow rectifier 70 is disposed at the bottom surface of the indented portion 62 of the flow path block 60 wherein the curved flow path 50 is formed, the opening portion 67 of the flow path block 60 is blocked by the circuit board 80, to form the sensor flow path portion 53, and thus the flow rectifier 70 can be disposed extremely easily in the sensor flow path portion 53.

Additionally, in the flow volume controlling device 1A according to the form of embodiment set forth above, the flow rectifying effect of the measurement fluid can be obtained while suppressing any increase in pressure loss, and thus it is possible to increase the accuracy of the flow volume adjustment of the fluid because of the provision of the flow meter 2A with the high flow volume measurement accuracy.

Note that while in the present embodiment an example is illustrated wherein a curved flow path 50 with a square cross-sectional shape was used, a flow path with a circular cross-sectional shape, or a flow path with a shape that is a combination of straight lines and curved lines may be used. In such a case, a flow rectifying plate having a plane shape corresponding to the cross-sectional shape of the flow path is used.

While in the present form of embodiment, an example is illustrated wherein thin flow rectifying plates 71 and 72 (for measuring extremely small flow volumes), wherein the holes are formed through etching, are used, a flow rectifying plate having the rigidity of being relatively thick (for measuring medium flow volumes and high flow volumes), wherein holes are formed through punching a plate-shaped member, may be used instead.

While in the various forms of embodiment set forth above, examples are illustrated wherein a thermal flow volume sensor is used as the flow volume detecting means, instead of the thermal flow volume sensor, flow volume sensors of other types (ultrasonic or electromagnetic) can be used as the flow volume detecting means. Additionally, in the present form of embodiment an example is illustrated wherein the present invention is applied to a gas flow meter; however, the present invention can also be applied to a flow meter that detects the flow volume of a liquid. The present invention can be embodied in a variety of ways in a scope that does not deviate from the spirit or intent thereof. Note that the terms "up" and "down" and the like used in the explanations thereof are expressions of convenience, and do not express limitations of directions relative to the direction of the force of gravity.

The invention claimed is:

1. A flow meter for measuring the flow of a measurement fluid, comprising:
   a flow path wherein the measurement fluid flows;
   a flow rectifier disposed within the flow path;
   a flow path block having a flow path forming portion that extends in the form of a straight line so as to form a flow path, provided therein, and an opening portion connecting between above the flow path forming portion and the outside; and
   a cover member disposed so as to cover the opening portion of the flow path block, wherein:
   the flow rectifier has a hole rectifying the flow of the measurement fluid, and a cross-sectional area that is wider than the cross-sectional area of the flow path in a direction that is perpendicular to the direction in which the flow path extends,
   the flow rectifier has at least one flow rectifying plate that is disposed at an incline relative to the direction it which the flow path extends,
   the flow rectifying plate is disposed with the outer peripheral surface thereof in contact around the entire periphery of the inner wall of the flow path,
   the flow path is a straight pipe-shaped flow path that is formed by the opening member covering the opening portion of the flow path block; and
   when the cover member covers the opening portion of the flow path block, the outer peripheral surface of the flow rectifying plate contacts the cover member, and the outer peripheral surface of the flow rectifying plate contacts the inner wall of the flow path block, so that the flow rectifying plate is secured and held between the cover member and the inner wall of the flow path block.

2. A flow meter as set forth in claim 1, wherein:
the position of contact of the flow rectifying plate in the cover member and the position of contact of the flow rectifying plate in the flow path block are disposed so as to be different in the direction in which the straight pipe-shaped flow path extends.

3. A flow meter as set forth in claim 1, wherein:
the straight pipe-shaped flow path has a sensor flow path portion wherein is disposed a flow sensor for detecting the flow speed or flow volume of the measurement fluid, and a wide diameter flow path portion with a flow path cross-sectional area that is larger than that of the sensor flow path portion, are formed on the upstream side and/or the downstream side of the sensor flow path portion;
the end surface of the sensor flow path portion side of the wide diameter flow path portion is provided in a form that is inclined relative to a plane that is perpendicular to the direction in which the straight pipe-shaped flow path extends; and
the flow rectifying plate is disposed and secured in contact with the end surface of the wide diameter flow path portion of the straight pipe-shaped flow path.

4. A flow meter for measuring the flow of a measurement fluid, comprising:
a flow path wherein the measurement fluid flows, and
a flow rectifier disposed within the flow path, wherein:
the flow rectifier has a hole rectifying the flow of the measurement fluid, and a cross-sectional area that is wider than the cross-sectional area of the flow path in a direction that is perpendicular to the direction in which the flow path extends,
the flow rectifier has at least one flow rectifying plate that is disposed at an incline relative to the direction it which the flow path extends.,
the flow rectifying plate is disposed with the outer peripheral surface thereof in contact around the entire periphery of the inner wall of the flow path,
the flow path is a curved path that has a sensor flow path portion that extends in the form of a straight line, wherein is disposed a flow sensor for detecting a flow speed or a flow volume of a measurement fluid, and is structured so that an upstream side or downstream side of the sensor flow path portion is curved at a curved portion;
the flow rectifier is structured from a flat plate that is disposed on the inside wall of the sensor flow path portion and a flow rectifying plate that is connected at an incline to the upstream side end portion or the downstream side end portion of the flat plate; and
the flow rectifier is secured in the curved flow path by the outer peripheral surface of the flow rectifying plate being disposed so as to contact the inside wall of the curved portion of the curved flow path.

5. A flow meter as set forth in claim 4, comprising:
a flow path block wherein a sensor flow path forming portion that extends in the form of a straight line in order to form a sensor flow path portion of the curved flow path is provided on the inside thereof, having an opening portion connecting between above the sensor flow path forming portion and the outside; and
a circuit board, having the flow sensor on one side thereof and having an electric circuit electrode connecting to an electric circuit, performing the measurement principles using the flow sensor, on the other side thereof; wherein
the circuit board is disposed, relative to the flow path block, so that the circuit board covers the opening portion of the flow path block and so that the flow sensor of the circuit board faces the sensor flow path forming portion of the flow path block, to form the sensor flow path portion of the curved flow path.

6. A flow meter as set forth in claim 1, wherein:
the flow rectifying plate is structured through forming the hole in a rigid plate-shaped member through punching.

7. A flow meter as set forth in claim 1, wherein:
the flow rectifying plate is structured through forming a hole in a thin plate through etching.

8. A flow meter as set forth in claim 1, wherein:
the flow rectifier is a colander shape that is formed so as to bulge out in the direction in which the flow path extends.

9. A flow volume controlling device comprising:
a flow meter as set forth in claim 1;
a controlling valve; and
a controller adjusting the flow volume of a fluid flowing in the flow path of the flow meter, through controlling the controlling valve based on information pertaining to the flow volume detected by the flow meter.

10. A flow meter as set forth in claim 4, wherein:
the flow rectifying plate is structured through forming the hole in a rigid plate-shaped member through punching.

11. A flow meter as set forth in claim 4, wherein:
the flow rectifying plate is structured through forming a hole in a thin plate through etching.

12. A flow meter as set forth in claim 4, wherein:
the flow rectifier is a colander shape that is formed so as to bulge out in the direction in which the flow path extends.

13. A flow volume controlling device comprising:
a flow meter as set forth in claim 4;
a controlling valve; and
a controller adjusting the flow volume of a fluid flowing in the flow path of the flow meter, through controlling the controlling valve based on information pertaining to the flow volume detected by the flow meter.

* * * * *